United States Patent
SivaSiva Ganesan et al.

(10) Patent No.: US 11,540,108 B2
(45) Date of Patent: Dec. 27, 2022

(54) COMMUNICATION APPARATUS AND COMMUNICATION METHOD

(71) Applicant: NOKIA SOLUTIONS AND NETWORKS OY, Espoo (FI)

(72) Inventors: Rakash SivaSiva Ganesan, Unterhaching (DE); Christian Markwart, Munich (DE); Borislava Gajic, Unterhaching (DE); Christian Mannweiler, Munich (DE); Peter Rost, Heidelberg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 11 days.

(21) Appl. No.: 17/268,372

(22) PCT Filed: Aug. 16, 2018

(86) PCT No.: PCT/EP2018/072263
§ 371 (c)(1),
(2) Date: Feb. 12, 2021

(87) PCT Pub. No.: WO2020/035146
PCT Pub. Date: Feb. 20, 2020

(65) Prior Publication Data
US 2021/0321244 A1    Oct. 14, 2021

(51) Int. Cl.
*H04W 8/02* (2009.01)
*H04W 40/22* (2009.01)

(52) U.S. Cl.
CPC ............. *H04W 8/02* (2013.01); *H04W 40/22* (2013.01)

Legend:
1101 End Device
  1101a Listener Part
  1101b Talker Part
1102 End Device
  1102a Listener Part
  1102b Talker Part
1103 Translator Client
1104 User Equipment
1105 Radio Access Network
1106 Core Network
1107 Translator
1108 Time Sensitive Network

(58) Field of Classification Search
None
See application file for complete search history.

(56) References Cited

U.S. PATENT DOCUMENTS

| | | |
|---|---|---|
| 2003/0210671 A1 | 11/2003 | Eglin |
| 2007/0248049 A1 | 10/2007 | Fajardo et al. |
| 2010/0332615 A1 | 12/2010 | Short et al. |
| 2016/0309524 A1 | 10/2016 | Barreto de Miranda Sargento et al. |
| 2016/0337912 A1 | 11/2016 | Taneja et al. |
| 2017/0237649 A1* | 8/2017 | Sampath ............. H04L 43/0888 370/238 |

(Continued)

FOREIGN PATENT DOCUMENTS

EP    1 467 526 A1    10/2004

OTHER PUBLICATIONS

First Examination Report dated Feb. 1, 2022 corresponding to Indian Patent Application No. 202147010577.

(Continued)

*Primary Examiner* — Jung H Park
(74) *Attorney, Agent, or Firm* — Squire Patton Boggs (US) LLP

(57) ABSTRACT

There is provided an apparatus comprising means for: translating between a first communication apparatus and a first wireless communication network operating as at least part of a bridge between the first communication apparatus and a second communication apparatus; determining that the first and/or second communication apparatus is undergoing or has undergone a mobility event; and executing at least part of a mobility procedure resulting from the mobility event.

18 Claims, 17 Drawing Sheets

(56) References Cited

U.S. PATENT DOCUMENTS

2019/0342800 A1* 11/2019 Sirotkin .............. H04W 80/02
2021/0112486 A1*  4/2021 Ke .................... H04W 48/18
2021/0168658 A1*  6/2021 Yu .................... H04M 15/66

OTHER PUBLICATIONS

International Search Report and Written Opinion dated Jan. 22, 2019 corresponding to International Patent Application No. PCT/EP2018/072263.

Invitation to Pay Additional Fees and, Where Applicable, Protest Fee with Partial Search Report dated Nov. 27, 2018 corresponding to International Patent Application No. PCT/EP2018/072263.

* cited by examiner

Legend:
100 Wireless Communication System
102 Communication Device
104 Communication Device
105 Communication Device
106 Base Station
107 Base Station
108 Control Apparatus
109 Control Apparatus
111 Gateway
112 Gateway
113 Wider Communications Network
116 Smaller Base Station
118 Smaller Base Station
120 Smaller Base Station Legend:
200 Communication Device
201 Data Processing Entity
202 Memory
203 Other Possible Components
204 Circuit Board / Chipsets
205 Key Pad
206 Transceiver
207 Air / Radio Interface
208 Display Legend:
300 Control Apparatus
301 Memory
302 Data Processing Unit
303 Data Processing Unit
304 Input / Output Interface Legend:
401 Terminal
402 Wireless Network
403 Terminal
404 Wireless Network
405 Terminal
406 Wireless Network
407 Time Sensitive Network Legend:
501 Terminal
502 Wireless Network
502a Radio Access Network Part
502b Core Network Part
502c Translator
503 Wireless Network
503a Radio Access Network Part
503b Core Network Part
503c Translator
504 Time Sensitive Network
505 End Device Legend:
501 Terminal
502 Wireless Network
 502a Radio Access Network Part
 502b Core Network Part
 502c Translator
503 Wireless Network
 503a Radio Access Network Part
 503b Core Network Part
 503c Translator
504 Time Sensitive Network
505 End Device Legend:
501 Terminal
502 Wireless Network
502a Radio Access Network Part
502b Core Network Part
502c Translator
503 Wireless Network
503a Radio Access Network Part
503b Core Network Part
503c Translator
504 Time Sensitive Network
505 End Device Legend:
501 Terminal
502 Wireless Network
502a Radio Access Network Part
502b Core Network Part
502c Translator
503 Wireless Network
503a Radio Access Network Part
503b Core Network Part
503c Translator
504 Time Sensitive Network
505 End Device Legend:
501 Terminal
502 Wireless Network
  502a Radio Access Network Part
  502b Core Network Part
  502c Translator
503 Wireless Network
  503a Radio Access Network Part
  503b Core Network Part
  503c Translator
504 Time Sensitive Network
505 End Device
901 Wireless Network
  901a Radio Access Network Part
  901b Core Network Part
  901c Translator Legend:

1001 Terminal
1002 Wireless Network
  1002a Radio Access Network Part
  1002b Core Network Part
  1002c Translator
1003 Wireless Network
  1003a Radio Access Network Part
  1003b Core Network Part
  1003c Translator
1004 Wireless Network
  1004a Radio Access Network Part
  1004b Core Network Part
  1004c Translator
1005 Time Sensitive Network
1006 End Device Legend:
1101 End Device
 1101a Listener Part
 1101b Talker Part
1102 End Device
 1102a Listener Part
 1102b Talker Part
1103 Translator Client
1104 User Equipment
1105 Radio Access Network
1106 Core Network
1107 Translator
1108 Time Sensitive Network Legend:
1201 End Device
1202 Translator Client Functionality
1203 User Equipment
1204 Wireless Network
1204a Radio Access Network
1204b Core Network
1204c Translator
1205 Wireless Network
1205a Radio Access Network
1205b Core Network
1205c Translator
1206 Wireless Network
1206a Radio Access Network
1206b Core Network
1206c Translator
1207 Time Sensitive Network
1208 End Device Legend:
1201 End Device
1202 Translator Client Functionality
1203 User Equipment
1204 Wireless Network
1204a Radio Access Network
1204b Core Network
1204c Translator
1205 Wireless Network
1205a Radio Access Network
1205b Core Network
1205c Translator
1206 Wireless Network
1206a Radio Access Network
1206b Core Network
1206c Translator
1207 Time Sensitive Network
1208 End Device Legend:
1201 End Device
1202 Translator Client Functionality
1203 User Equipment
1204 Wireless Network
 1204a Radio Access Network
 1204b Core Network
 1204c Translator
1205 Wireless Network
 1205a Radio Access Network
 1205b Core Network
 1205c Translator
1206 Wireless Network
 1206a Radio Access Network
 1206b Core Network
 1206c Translator
1207 Time Sensitive Network
1208 End Device Legend:
1601 First Communication Apparatus
1602 Second Communication Apparatus
1603 Bridge
1604 Apparatus
1605 First Wireless Network
1606 Second Wireless Network
1607 User Equipment Legend:
1701 First Communication Apparatus
1702 Second Communication Apparatus
1703 Bridge
1704 Apparatus
1705 First Wireless Network
1706 Third Wireless Network
1707 User Equipment
1708 Third Apparatus Legend:
1801 First Communication Apparatus
1802 Second Communication Apparatus
1803 Bridge
1804 First Apparatus
1805 Third Apparatus
1806 First Wireless Network
1807 Third Wireless Network
1808 User Equipment

COMMUNICATION APPARATUS AND COMMUNICATION METHOD

FIELD

The present application relates to a method, apparatus, and computer program.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to a first aspect, there is provided an apparatus comprising means for: translating between a first communication apparatus and a first wireless communication network operating as at least part of a bridge between the first communication apparatus and a second communication apparatus; determining that the first and/or second communication apparatus is undergoing or has undergone a mobility event; and executing at least part of a mobility procedure resulting from the mobility event.

The apparatus may comprise means for: determining that the second communication apparatus has undergone a mobility event; and executing at least part of a mobility procedure by: receiving first communication traffic from the second communication apparatus via a second wireless communication network operating as at least part of the bridge between the first communication apparatus and the second communication apparatus; and forwarding the first received communication traffic to the first communication apparatus by translating between the second wireless communication network and the first communication apparatus.

The apparatus may comprise means for: determining that the second communication apparatus has undergone a mobility event; and executing at least part of a mobility procedure by: receiving second communication traffic from the second communication apparatus; identifying a third apparatus, the third apparatus comprising means for translating between the first communication apparatus and a third wireless communication network operating as at least part of the bridge between the first communication apparatus and the second communication apparatus; and forwarding the received second communication traffic from the second communication apparatus to the third apparatus.

The apparatus may comprise means for: determining that the second communication apparatus has undergone a mobility event; and executing at least part of a mobility procedure by: receiving third communication traffic from the first communication apparatus; and forwarding the third received communication traffic to the second communication apparatus by translating between the first communication apparatus and a fourth wireless communication network; and operating as at least part of the bridge between the first communication apparatus and the second communication apparatus.

The apparatus may comprise means for: determining that the second communication apparatus has undergone a mobility event; and executing at least part of a mobility procedure by: receiving fourth communication traffic from a via a third apparatus, the third apparatus comprising means for translating between the first communication apparatus and a fifth wireless communication network operating as at least part of the bridge between the first communication apparatus and the second communication apparatus; and forwarding the received fourth communication traffic to the second communication apparatus via the fifth wireless communication network.

The apparatus may comprise means for: executing at least part of a mobility procedure by: receiving fifth communication traffic from the second communication apparatus; identifying a third apparatus, the third apparatus comprising means for translating between the first communication apparatus and a sixth wireless communication network operating as at least part of the bridge between the first communication apparatus and the second communication apparatus; and forwarding the received fifth communication traffic from the second communication apparatus to the third apparatus and to the first communication apparatus.

The apparatus may comprise means for: executing at least part of a mobility procedure by: receiving sixth communication traffic from the first communication apparatus; determining whether or not the apparatus currently forms part of an active communication path to the second communication apparatus via a seventh wireless network; and when the apparatus does form part of the current active communication path, forwarding the received sixth communication traffic to the second communication apparatus; and when the apparatus does not form part of the current active communication path, discarding the received sixth communication traffic.

According to a second aspect, there is provided an apparatus comprising means for: simultaneously connecting to multiple parts of a bridge, wherein one of said parts forms part of a currently active communication path between the apparatus and a second communication apparatus; and receiving information from at least one of said parts indicating which one of said parts forms part of the currently active communication path; and forwarding the received information to at least one other part of said multiple parts of a bridge.

The apparatus may comprise means for: detecting that only one copy of a packet has been received; identifying, in response to said detecting, whether the packet is part of a stream of packets for which only one copy of the packet is expected; and only generating and transmitting an alarm when it is identified that the packet is not part of said stream of packets.

According to a third aspect, there is provided a method comprising: translating, by an apparatus, between a first communication apparatus and a first wireless communication network operating as at least part of a bridge between the first communication apparatus and a second communication apparatus; determining, by the apparatus, that the first and/or second communication apparatus is undergoing or has undergone a mobility event; and executing, by the apparatus, at least part of a mobility procedure resulting from the mobility event.

The method may comprise: determining, by the apparatus, that the second communication apparatus has undergone a mobility event; and executing, by the apparatus, at least part of a mobility procedure by: receiving first communication traffic from the second communication apparatus via a second wireless communication network operating as at least part of the bridge between the first communication apparatus and the second communication apparatus; and forwarding the first received communication traffic to the first communication apparatus by translating between the second wireless communication network and the first communication apparatus.

The method may comprise: determining, by the apparatus, that the second communication apparatus has undergone a mobility event; and executing, by the apparatus, at least part of a mobility procedure by: receiving second communication traffic from the second communication apparatus; identifying a third apparatus, the third apparatus comprising means for translating between the first communication apparatus and a third wireless communication network operating as at least part of the bridge between the first communication apparatus and the second communication apparatus; and forwarding the received second communication traffic from the second communication apparatus to the third apparatus.

The method may comprise: determining, by the apparatus, that the second communication apparatus has undergone a mobility event; and executing, by the apparatus, at least part of a mobility procedure by: receiving third communication traffic from the first communication apparatus; and forwarding the third received communication traffic to the second communication apparatus by translating between the first communication apparatus and a fourth wireless communication network; and operating as at least part of the bridge between the first communication apparatus and the second communication apparatus.

The method may comprise: determining, by the apparatus, that the second communication apparatus has undergone a mobility event; and executing, by the apparatus, at least part of a mobility procedure by: receiving fourth communication traffic from a via a third apparatus, the third apparatus comprising means for translating between the first communication apparatus and a fifth wireless communication network operating as at least part of the bridge between the first communication apparatus and the second communication apparatus; and forwarding the received fourth communication traffic to the second communication apparatus via the fifth wireless communication network.

The method may comprise: executing, by the apparatus, at least part of a mobility procedure by: receiving fifth communication traffic from the second communication apparatus; identifying a third apparatus, the third apparatus comprising means for translating between the first communication apparatus and a sixth wireless communication network operating as at least part of the bridge between the first communication apparatus and the second communication apparatus; and forwarding the received fifth communication traffic from the second communication apparatus to the third apparatus and to the first communication apparatus.

The method may comprise: executing, by the apparatus, at least part of a mobility procedure by: receiving sixth communication traffic from the first communication apparatus; determining whether or not the apparatus currently forms part of an active communication path to the second communication apparatus via a seventh wireless network; and when the apparatus does form part of the current active communication path, forwarding the received sixth communication traffic to the second communication apparatus; and when the apparatus does not form part of the current active communication path, discarding the received sixth communication traffic.

According to a fourth aspect, there is provided an a method comprising: simultaneously, by an apparatus, connecting to multiple parts of a bridge, wherein one of said parts forms part of a currently active communication path between the apparatus and a second communication apparatus; and receiving, by the apparatus, information from at least one of said parts indicating which one of said parts forms part of the currently active communication path; and forwarding, by the apparatus, the received information to at least one other part of said multiple parts of a bridge.

The method may comprise: detecting, by the apparatus, that only one copy of a packet has been received; identifying, by the apparatus, in response to said detecting, whether the packet is part of a stream of packets for which only one copy of the packet is expected; and only generating and transmitting an alarm when it is identified that the packet is not part of said stream of packets.

According to a fifth aspect, there is provided an apparatus comprising: at least one processor: and at least one memory comprising code that, when executed by the at least one processor, causes the apparatus to: translate between a first communication apparatus and a first wireless communication network operating as at least part of a bridge between the first communication apparatus and a second communication apparatus; determine that the first and/or second communication apparatus is undergoing or has undergone a mobility event; and execute at least part of a mobility procedure resulting from the mobility event.

The apparatus may further be caused to: determine that the second communication apparatus has undergone a mobility event; and execute at least part of a mobility procedure by: receiving first communication traffic from the second communication apparatus via a second wireless communication network operating as at least part of the bridge between the first communication apparatus and the second communication apparatus; and forwarding the first received communication traffic to the first communication apparatus by translating between the second wireless communication network and the first communication apparatus.

The apparatus may further be caused to: determine that the second communication apparatus has undergone a mobility event; and execute at least part of a mobility procedure by: receiving second communication traffic from the second communication apparatus; identifying a third apparatus, the third apparatus comprising means for translating between the first communication apparatus and a third wireless communication network operating as at least part of the bridge between the first communication apparatus and the second communication apparatus; and forwarding the received second communication traffic from the second communication apparatus to the third apparatus.

The apparatus may further be caused to: determine that the second communication apparatus has undergone a mobility event; and execute at least part of a mobility procedure by: receiving third communication traffic from the first communication apparatus; and forwarding the third received communication traffic to the second communication apparatus by translating between the first communication apparatus and a fourth wireless communication network; and operating as at least part of the bridge between the first communication apparatus and the second communication apparatus.

The apparatus may further be caused to: determine that the second communication apparatus has undergone a mobility event; and execute at least part of a mobility procedure by: receiving fourth communication traffic from a via a third apparatus, the third apparatus comprising means for translating between the first communication apparatus and a fifth wireless communication network operating as at least part of the bridge between the first communication apparatus and the second communication apparatus; and forwarding the received fourth communication traffic to the second communication apparatus via the fifth wireless communication network.

The apparatus may further be caused to: execute at least part of a mobility procedure by: receiving fifth communication traffic from the second communication apparatus; identifying a third apparatus, the third apparatus comprising means for translating between the first communication apparatus and a sixth wireless communication network operating as at least part of the bridge between the first communication apparatus and the second communication apparatus; and forwarding the received fifth communication traffic from the second communication apparatus to the third apparatus and to the first communication apparatus.

The apparatus may further be caused to: execute at least part of a mobility procedure by: receiving sixth communication traffic from the first communication apparatus; determining whether or not the apparatus currently forms part of an active communication path to the second communication apparatus via a seventh wireless network; and when the apparatus does form part of the current active communication path, forwarding the received sixth communication traffic to the second communication apparatus; and when the apparatus does not form part of the current active communication path, discarding the received sixth communication traffic.

According to a sixth aspect, there is provided an apparatus comprising: at least one processor: and at least one memory comprising code that, when executed by the at least one processor, causes the apparatus to: simultaneously connect to multiple parts of a bridge, wherein one of said parts forms part of a currently active communication path between the apparatus and a second communication apparatus; and receive information from at least one of said parts indicating which one of said parts forms part of the currently active communication path; and forward the received information to at least one other part of said multiple parts of a bridge.

The apparatus may further be caused to: detect that only one copy of a packet has been received; identify in response to said detecting, whether the packet is part of a stream of packets for which only one copy of the packet is expected; and only generate and transmit an alarm when it is identified that the packet is not part of said stream of packets.

According to a sixth aspect, there is provided a computer program comprising instructions [or a computer readable medium comprising program instructions] for causing an apparatus to perform at least the following: translating between a first communication apparatus and a first wireless communication network operating as at least part of a bridge between the first communication apparatus and a second communication apparatus; determining that the first and/or second communication apparatus is undergoing or has undergone a mobility event; and executing at least part of a mobility procedure resulting from the mobility event.

The apparatus may be caused to perform: determining that the second communication apparatus has undergone a mobility event; and executing at least part of a mobility procedure by: receiving first communication traffic from the second communication apparatus via a second wireless communication network operating as at least part of the bridge between the first communication apparatus and the second communication apparatus; and forwarding the first received communication traffic to the first communication apparatus by translating between the second wireless communication network and the first communication apparatus.

The apparatus may be caused to perform: determining that the second communication apparatus has undergone a mobility event; and executing at least part of a mobility procedure by: receiving second communication traffic from the second communication apparatus; identifying a third apparatus, the third apparatus comprising means for translating between the first communication apparatus and a third wireless communication network operating as at least part of the bridge between the first communication apparatus and the second communication apparatus; and forwarding the received second communication traffic from the second communication apparatus to the third apparatus.

The apparatus may be caused to perform: determining that the second communication apparatus has undergone a mobility event; and executing at least part of a mobility procedure by: receiving third communication traffic from the first communication apparatus; and forwarding the third received communication traffic to the second communication apparatus by translating between the first communication apparatus and a fourth wireless communication network; and operating as at least part of the bridge between the first communication apparatus and the second communication apparatus.

The apparatus may be caused to perform: determining that the second communication apparatus has undergone a mobility event; and executing at least part of a mobility procedure by: receiving fourth communication traffic from a via a third apparatus, the third apparatus comprising means for translating between the first communication apparatus and a fifth wireless communication network operating as at least part of the bridge between the first communication apparatus and the second communication apparatus; and forwarding the received fourth communication traffic to the second communication apparatus via the fifth wireless communication network.

The apparatus may be caused to perform: executing at least part of a mobility procedure by: receiving fifth communication traffic from the second communication apparatus; identifying a third apparatus, the third apparatus comprising means for translating between the first communication apparatus and a sixth wireless communication network operating as at least part of the bridge between the first communication apparatus and the second communication apparatus; and forwarding the received fifth communication traffic from the second communication apparatus to the third apparatus and to the first communication apparatus.

The apparatus may be caused to perform: executing at least part of a mobility procedure by: receiving sixth communication traffic from the first communication apparatus; determining whether or not the apparatus currently forms part of an active communication path to the second communication apparatus via a seventh wireless network; and when the apparatus does form part of the current active communication path, forwarding the received sixth communication traffic to the second communication apparatus; and when the apparatus does not form part of the current active communication path, discarding the received sixth communication traffic.

According to a seventh aspect, there is provided a computer program comprising instructions [or a computer readable medium comprising program instructions] for causing an apparatus to perform at least the following: simultaneously connecting to multiple parts of a bridge, wherein one of said parts forms part of a currently active communication path between the apparatus and a second communication apparatus; and receiving information from at least one of said parts indicating which one of said parts forms part of the currently active communication path; and forwarding the received information to at least one other part of said multiple parts of a bridge.

The apparatus may be caused to perform: detecting that only one copy of a packet has been received; identifying, in response to said detecting, whether the packet is part of a stream of packets for which only one copy of the packet is expected; and only generating and transmitting an alarm when it is identified that the packet is not part of said stream of packets.

According to an eighth aspect, there is provided non-transitory computer readable medium comprising program instructions for causing an apparatus to perform at least the following: translating between a first communication apparatus and a first wireless communication network operating as at least part of a bridge between the first communication apparatus and a second communication apparatus; determining that the first and/or second communication apparatus is undergoing or has undergone a mobility event; and executing at least part of a mobility procedure resulting from the mobility event.

The apparatus may be caused to perform: determining that the second communication apparatus has undergone a mobility event; and executing at least part of a mobility procedure by: receiving first communication traffic from the second communication apparatus via a second wireless communication network operating as at least part of the bridge between the first communication apparatus and the second communication apparatus; and forwarding the first received communication traffic to the first communication apparatus by translating between the second wireless communication network and the first communication apparatus.

The apparatus may be caused to perform: determining that the second communication apparatus has undergone a mobility event; and executing at least part of a mobility procedure by: receiving second communication traffic from the second communication apparatus; identifying a third apparatus, the third apparatus comprising means for translating between the first communication apparatus and a third wireless communication network operating as at least part of the bridge between the first communication apparatus and the second communication apparatus; and forwarding the received second communication traffic from the second communication apparatus to the third apparatus.

The apparatus may be caused to perform: determining that the second communication apparatus has undergone a mobility event; and executing at least part of a mobility procedure by: receiving third communication traffic from the first communication apparatus; and forwarding the third received communication traffic to the second communication apparatus by translating between the first communication apparatus and a fourth wireless communication network; and operating as at least part of the bridge between the first communication apparatus and the second communication apparatus.

The apparatus may be caused to perform: determining that the second communication apparatus has undergone a mobility event; and executing at least part of a mobility procedure by: receiving fourth communication traffic from a via a third apparatus, the third apparatus comprising means for translating between the first communication apparatus and a fifth wireless communication network operating as at least part of the bridge between the first communication apparatus and the second communication apparatus; and forwarding the received fourth communication traffic to the second communication apparatus via the fifth wireless communication network.

The apparatus may be caused to perform: executing at least part of a mobility procedure by: receiving fifth communication traffic from the second communication apparatus; identifying a third apparatus, the third apparatus comprising means for translating between the first communication apparatus and a sixth wireless communication network operating as at least part of the bridge between the first communication apparatus and the second communication apparatus; and forwarding the received fifth communication traffic from the second communication apparatus to the third apparatus and to the first communication apparatus.

The apparatus may be caused to perform: executing at least part of a mobility procedure by: receiving sixth communication traffic from the first communication apparatus; determining whether or not the apparatus currently forms part of an active communication path to the second communication apparatus via a seventh wireless network; and when the apparatus does form part of the current active communication path, forwarding the received sixth communication traffic to the second communication apparatus; and when the apparatus does not form part of the current active communication path, discarding the received sixth communication traffic.

According to a ninth aspect, there is provided non-transitory computer readable medium comprising program instructions for causing an apparatus to perform at least the following: simultaneously connecting to multiple parts of a bridge, wherein one of said parts forms part of a currently active communication path between the apparatus and a second communication apparatus; and receiving information from at least one of said parts indicating which one of said parts forms part of the currently active communication path; and forwarding the received information to at least one other part of said multiple parts of a bridge.

The apparatus may be caused to perform: detecting that only one copy of a packet has been received; identifying, in response to said detecting, whether the packet is part of a stream of packets for which only one copy of the packet is expected; and only generating and transmitting an alarm when it is identified that the packet is not part of said stream of packets.

According to a tenth aspect, there is provided an apparatus comprising: translating circuitry for translating between a first communication apparatus and a first wireless communication network operating as at least part of a bridge between the first communication apparatus and a second communication apparatus; determining circuitry for determining that the first and/or second communication apparatus is undergoing or has undergone a mobility event; and executing circuitry for executing at least part of a mobility procedure resulting from the mobility event.

The apparatus may comprise: determining circuitry for determining that the second communication apparatus has undergone a mobility event; and executing circuitry for executing at least part of a mobility procedure by: receiving first communication traffic from the second communication apparatus via a second wireless communication network operating as at least part of the bridge between the first communication apparatus and the second communication apparatus; and forwarding the first received communication traffic to the first communication apparatus by translating between the second wireless communication network and the first communication apparatus.

The apparatus may comprise: determining circuitry for determining that the second communication apparatus has undergone a mobility event; and executing circuitry for executing at least part of a mobility procedure by: receiving second communication traffic from the second communication apparatus; identifying a third apparatus, the third apparatus comprising means for translating between the first communication apparatus and a third wireless communication network operating as at least part of the bridge between the first communication apparatus and the second communication apparatus; and forwarding the received second communication traffic from the second communication apparatus to the third apparatus.

The apparatus may comprise: determining circuitry for determining that the second communication apparatus has undergone a mobility event; and executing circuitry for executing at least part of a mobility procedure by: receiving third communication traffic from the first communication apparatus; and forwarding the third received communication traffic to the second communication apparatus by translating between the first communication apparatus and a fourth wireless communication network; and operating as at least part of the bridge between the first communication apparatus and the second communication apparatus.

The apparatus may comprise: determining circuitry for determining that the second communication apparatus has undergone a mobility event; and executing circuitry for executing at least part of a mobility procedure by: receiving fourth communication traffic from a via a third apparatus, the third apparatus comprising means for translating between the first communication apparatus and a fifth wireless communication network operating as at least part of the bridge between the first communication apparatus and the second communication apparatus; and forwarding the received fourth communication traffic to the second communication apparatus via the fifth wireless communication network.

The apparatus may comprise: executing circuitry for executing at least part of a mobility procedure by: receiving fifth communication traffic from the second communication apparatus; identifying a third apparatus, the third apparatus comprising means for translating between the first communication apparatus and a sixth wireless communication network operating as at least part of the bridge between the first communication apparatus and the second communication apparatus; and forwarding the received fifth communication traffic from the second communication apparatus to the third apparatus and to the first communication apparatus.

The apparatus may comprise: executing circuitry for executing at least part of a mobility procedure by: receiving sixth communication traffic from the first communication apparatus; determining whether or not the apparatus currently forms part of an active communication path to the second communication apparatus via a seventh wireless network; and when the apparatus does form part of the current active communication path, forwarding the received sixth communication traffic to the second communication apparatus; and when the apparatus does not form part of the current active communication path, discarding the received sixth communication traffic.

According to an eleventh aspect, there is provided an apparatus comprising: circuitry for simultaneously connecting to multiple parts of a bridge, wherein one of said parts forms part of a currently active communication path between the apparatus and a second communication apparatus; and receiving circuitry for receiving information from at least one of said parts indicating which one of said parts forms part of the currently active communication path; and forwarding circuitry for forwarding the received information to at least one other part of said multiple parts of a bridge.

The apparatus may comprise: detecting circuitry for detecting that only one copy of a packet has been received; identifying, in response to said detecting, whether the packet is part of a stream of packets for which only one copy of the packet is expected; and only generating and transmitting an alarm when it is identified that the packet is not part of said stream of packets.

According to a twelfth aspect, there is provided an apparatus configured to perform the actions of the method as described above.

According to a thirteenth aspect, there is provided a computer program comprising program instructions for causing a computer to perform any method as described above.

According to a fourteenth aspect, there is provided a computer program product stored on a medium may cause an apparatus to perform any method as described herein.

According to a fifteenth aspect, there is provided an electronic device that may comprise apparatus as described herein.

According to a sixteenth aspect, there is provided a chipset that may comprise an apparatus as described herein.

DESCRIPTION OF FIGURES

Embodiments will now be described, by way of example only, with reference to the accompanying Figures in which:

FIG. 15 is a flow chart of example operations performed by a part of a bridge between networks;

FIG. 19 is a flow chart of example operations performed by an apparatus in a time sensitive network.

DETAILED DESCRIPTION

Figure 1:
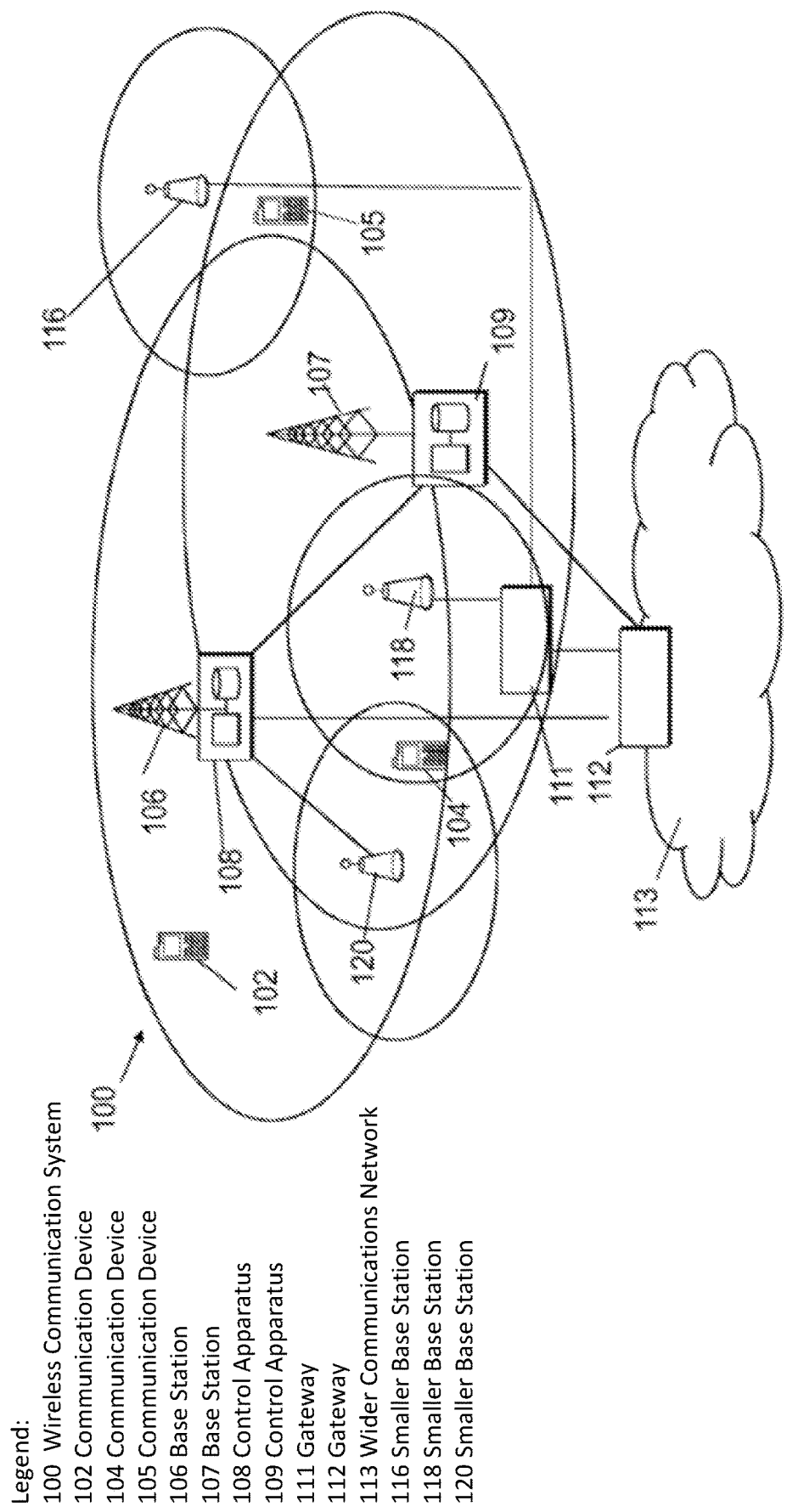
FIG. 1 shows a schematic diagram of an example communication system comprising a plurality of base stations and a plurality of communication devices.

In general, the following disclosure relates to facilitating communications when operating a bridge between networks during, before and/or after a mobility event.

A bridge is a computer networking apparatus (distributed or otherwise) that creates a single aggregate network from multiple communication networks (or network segments). Bridging is distinct from routing, which allows multiple networks to communicate independently yet remain separate. Bridging connects two separate networks as though they were a single network.

A bridge comprises functionality in order that it functions as a regular bridge between the connecting networks. Further, the presently described bridge comprises a second functionality to facilitate a mobility service of a wireless network. Consider the example of two end devices communicating with each other in accordance with a first communication protocol/network, through which at least part of the communications pass through a bridge comprising a wireless communication network. In this case, the bridge functionalities may be split up into two types of interfaces. One type of interface (e.g. a translator client) is an interface between an end device operating according to the first network-type and the wireless communication network. The other type of interface is an interface between network elements in the different networks (referred to herein as a translator). The interfaces are such that the bridge is transparent to the end devices/communication protocol of the end devices. Each bridge may comprise multiple of each of these types of interfaces.

Each of these types of interfaces (a translator and a translator client) may be considered to act as layer 2/data link layer ports for exchanging frames between networks. They may further provide information on the bridge, such as capabilities and neighbourhood of the bridge (such as the link layer discovery protocol). The translator and the translator client parts of a bridge translate information from a transmitting network into information for the receiving network. Translator and translator client functionality translate quality of service parameters of the connected networks into quality of service parameters of the wireless communication network. Together, the translator and translator client functionalities encapsulate a wireless communication network as a bridge used by the other network so that the wireless communication network is transparent to the other network's protocols. This means that a bridge may, in its entirety, be considered to comprise apparatus at both a user level and at a network level. However, as the operations performed by the translator and translator client differ from each other, they are often considered separately in the following. However, it is understood that they both provide translation functionality.

As discussed above, the translator and the translator client may be considered as ports of a bridge connecting separated networks. A current assumption is that ports are configured for traffic exchange and cannot be changed; even when a handover is performed, the networks assume the traffic will be exchanged via the configured ports. We consider the case in which an end device (operating according to a first network) comprised within a user equipment operating according to a wireless communication network moves from a first location to a second location (where the second location comprises a different provider offering a different connection via a different wireless network). In this situation, the translator client will move with the user equipment to the second location and hence the port for the translator client will remain the same. However, the port for the translator would change (as the second location provider provides its own translator/port). This new translator acts to the first network as a new/different port of the bridge or even as a new bridge, and so the first network may require reconfiguration. To avoid this, the first network may detect that the new port that needs to be addressed and re-routes traffic for the end device accordingly. This is discussed in more detail below.

The present application describes operations performed in relation to mobility-type events to help address these issues, and includes operations in which at least one translator-part of a bridge performs certain actions for facilitating mobility-related events. Operations of the translator clients and of entities in an interacting network are also considered. The exact operation that is performed depends on the type and/or form of mobility event being performed. This may depend on both the type of networks being bridged, in addition to the instantaneous configuration of the networks when the mobility event is being considered.

Before explaining in detail the examples, certain general principles of a wireless communication system and mobile communication devices are briefly explained with reference to FIGS. 1 to 2 to assist in understanding the technology underlying the described examples.

In a wireless communication system 100, such as that shown in FIG. 1, mobile communication devices or user apparatus (UE) 102, 104, 105 are provided wireless access via at least one base station or similar wireless transmitting and/or receiving node or point. A user can access the communication system by means of an appropriate communication device or terminal. A communication device of a user is often referred to as user equipment (UE) or as a user apparatus. Throughout the following, these terms will be used interchangeably. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. LTE is being standardized by the 3rd Generation Partnership Project (3GPP).

A base station is referred to as an eNodeB (eNB) in LTE, and may be referred to more generally as simply a network apparatus or a network access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each user apparatus is served by only one MME and/or S-GW at a time and the (e) NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In an LTE system, radio resource control (RRC) is defined to be a sublayer of radio interface Layer 3 that exists in the control plane only, and which provides information transfer service to the non-access stratum (see 3GPP Technical Specification Group Services and System Aspects 21.905). RRC is a protocol layer between a user apparatus and an eNB, and is in charge of, for example, paging the user apparatus when traffic comes, establishing/maintaining or release of radio bearers (establishing an RRC connection between user apparatus and eNB), user apparatus mobility, user apparatus measurement configuration and user apparatus reporting configuration, etc. RRC is responsible for controlling the configuration of radio interface Layers 1 and 2.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst station 120 connects via the controller apparatus 108. In some embodiments, the smaller stations may not be provided.

Figure 2:
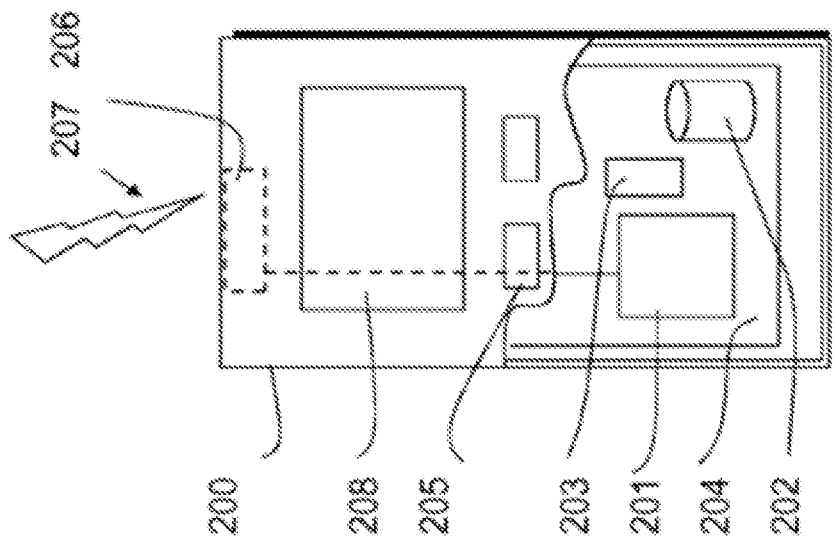
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user apparatus (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the long term evolution (LTE) or LTE Advanced Pro of the Universal Mobile Telecommunications System (UMTS) radio-access technology. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Figure 3:
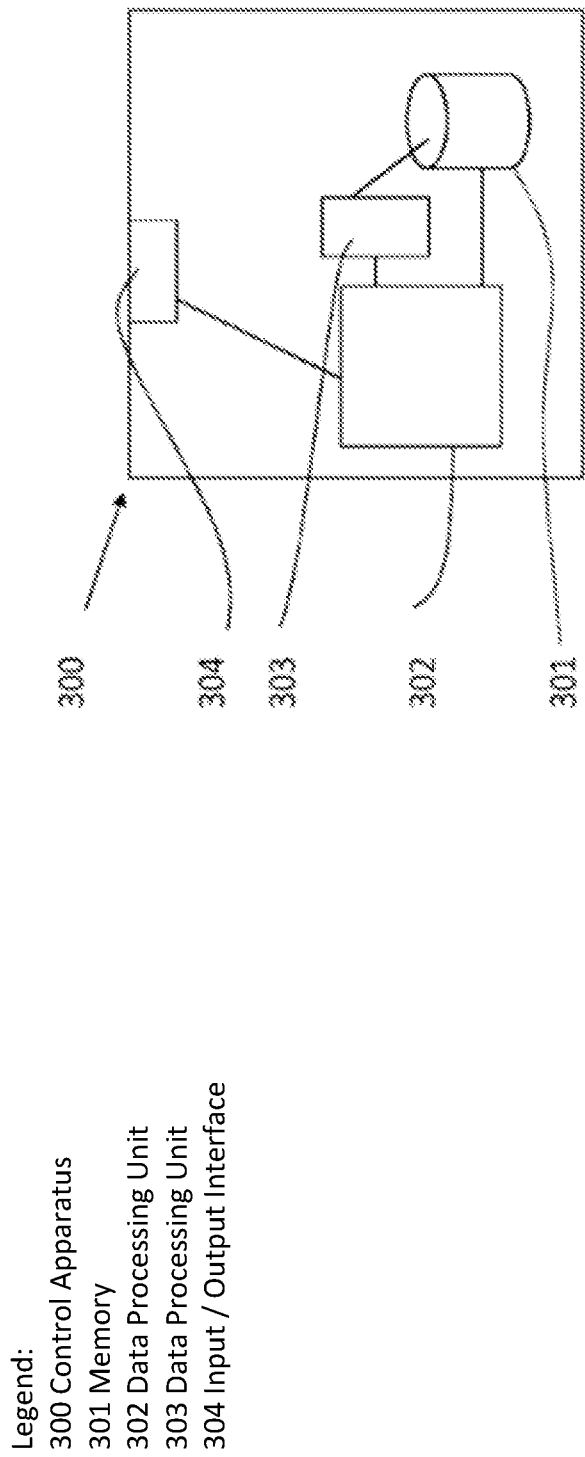
FIG. 3 shows a schematic diagram of an example network element.

An example network equipment for the 3GPP system is shown in FIG. 3. FIG. 3 shows an example of a control apparatus 300 for a communication system, for example to be coupled to and/or for controlling a station of an access system, such as a RAN node, e.g. a base station or (e) node B, or a node of a core network such as an MME. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example, the control apparatus 300 can be configured to execute an appropriate software code to provide the control functions. Control apparatus 300 may be included in a chipset or modem apparatus. A chipset or modem apparatus which includes apparatus 300 may be included in a control node such as an eNB.

Another type of network is a time sensitive network. Time sensitive networks may be used for communications within industrial networks. Time sensitive networks may be considered to have three basic components. First, they have time synchronisation, such that all devices that are participating in real-time communication have access to a common timing base. Second, they have defined scheduling and traffic shaping procedures, such that all devices that are participating in real-time communication adhere to the same rules in processing and forwarding communication packets. Third, they have defined selection of communication paths, path reservations and fault tolerance, such that all devices that are participating in real-time communication adhere to the same rules in selecting communication paths and in reserving bandwidth and time slots.

A time sensitive network has been standardised using a set of IEEE 802.1 protocols. These protocols aim to provide deterministic data transmission with guaranteed low latency with time-aware devices. Therefore, time sensitive networking (TSN) provides industrial networks with a deterministic delay to handle time sensitive traffic. Currently, wired links are assumed for connecting devices in the time sensitive network, such as sensors and controllers ("end devices"). Moving from wired to wireless sensors and actuators provides advantages such as mobility, scalability, low cost maintenance, etc. Wireless transmission mechanisms, such as the ones defined in 3GPP, may be used to connect wireless end devices to a time sensitive network.

A wireless 3GPP network may be transparently integrated with a time sensitive network (or any other type of network) by modelling the 3GPP network as one or multiple bridges (also referred to herein as wireless networks). For clarity, the following will model any network operating according to a first communication protocol that acts as a bridge between two end devices operating according to a second communication protocol as a single bridge having multiple ports/translators.

The time sensitive network may interact with these wireless networks in the manner defined in IEEE 802.1Q specifications. This enables the 3GPP network to provide wireless connectivity service to the time sensitive network in a transparent way.

By introducing a wireless communication service into a time sensitive network, the end devices/terminals may become mobile. If the mobility of the end device is limited to a single instance of 3GPP network (single wireless network) then the handover mechanism defined in 3GPP could be used to support mobile devices. However, an industrial campus often requires more flexibility to provide multiple network segments, e.g. to separate network resources and traffic at different locations of the campus. In such cases, independent wireless networks are needed. For instance, user plane processing in the core network may be co-located with base stations in order to localize/break-out traffic within the factory. Therefore, the user plane processing may be distributed, and with it also the set of wireless networks.

When a campus is organized using multiple wireless networks and wireless devices e.g. robots moving through the entire campus, the wireless networks may provide coverage to these moving devices, especially when it is not possible to provide an overlay network for the coverage due to limited spectrum resources. Switching a connection from one (first) wireless network to another (second) wireless network would require re-computation of an end-to-end time sensitive network schedule, which would impose significant computation burden to the time sensitive network and 3GPP networks and imply significant delays. For example, while mobility events in a 3GPP network are usually processed within 10 s of milliseconds, a reconfiguration of the time sensitive network schedule would be performed in seconds to minutes. In addition, it can also happen that an end-to-end schedule through the second wireless network may not be possible due to non-availability of network resources in some of the time sensitive network links, which would result in re-configuration of the other traffic streams deployed in parallel. Furthermore, in industrial networks, verification of the schedule before it goes online is a very important step. Hence, a solution is preferred that avoids re-configurations in/by a time sensitive network.

As discussed above, the following relates to facilitating communications in a bridge during, before and/or after a mobility event.

In the following examples and in the above, an example of a bridge comprising multiple wireless communication networks (such as a communication networks defined according to a set of related 3GPP standard protocols, such as 5G) for bridging between different elements of a time sensitive network is used. References to these specific networks are for illustrative purposes only, and the principles discussed herein are not limited to these specific network types. The following techniques are particularly useful when applied to bridges comprising wireless networks and any network that is constrained to fulfil certain quality of service characteristics. The quality of service characteristics are defined by the operating communication protocol of the constrained network. Such a constrained network will have associated defined mechanisms for enforcing this quality of service, such as reliability mechanisms, scheduling mechanisms, etc.

The operations of the bridge may be localised within the bridge (for example, to a network domain-only part of the bridge and/or to a user domain-only part of the bridge).

The following will consider the example of a wireless network-located apparatus acting as at least part of a bridge (hereinafter referred to as a first wireless network) between two elements of a time sensitive network.

Figure 4:
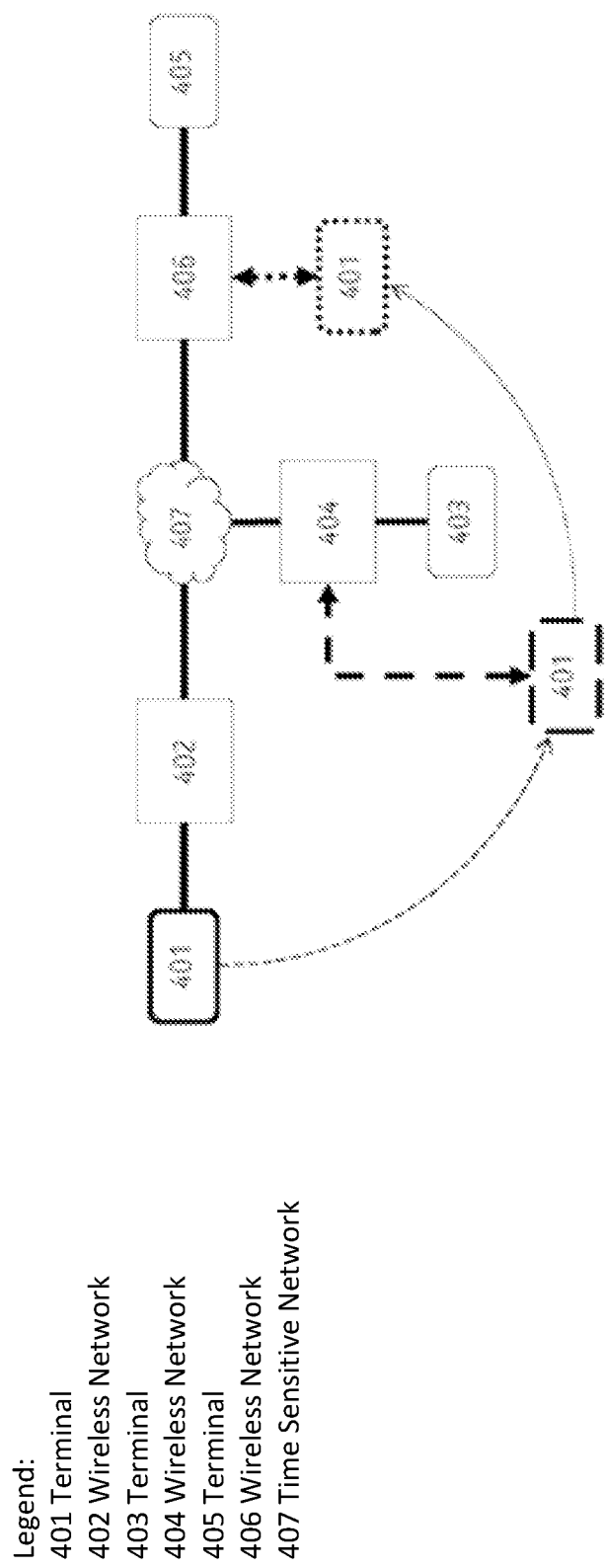
FIG. 4 shows a schematic diagram of terminals communicating with each other using a bridge between different networks.

FIG. 4 illustrates an example network. In FIG. 4, terminal 401 is initially connected to wireless network 402, terminal 403 is initially connected to wireless network 404 and terminal 405 is initially connected to wireless network 406. The term terminal is used in the present case to indicate at least one of: the end device associated with a time sensitive network, a user equipment configured to communicate using at least one wireless network, the user equipment comprising/being associated with the end device, and a translator client between the two. The term wireless network is used herein to refer to the at least one network-based part of a bridge between an end device and a time sensitive network comprising an end device with which the terminal is communicating. Each terminal is connected to its wireless network via a wireless communication protocol. Each of the wireless networks transparently connects their respective terminals to time sensitive network 407.

Although end devices 403 and 405 are shown as remaining connected to their respective wireless networks 404 and 406, end device 401 is physically mobile through the network and, after connecting to wireless network 402, makes subsequent connections to wireless network 404 and wireless network 406 as it physically moves (as indicated by the direction of the arrows in FIG. 4). This means that terminal 401 executes a handover from wireless network 402 to wireless network 404, to wireless network 406.

Depending on the network configuration, handover-related events may be effected using different mechanism.

Two such mechanisms are inter-bridge handovers and/or Frame Replication and Elimination for Reliability (FBER)-based handovers.

For inter-bridge handovers, a translator of a wireless network that first connects an end device/user equipment to a time sensitive network continues to route communications to the time sensitive network even after the end device hands over to another 3GPP network apparatus. This is illustrated in the following Figures.

Figure 5:
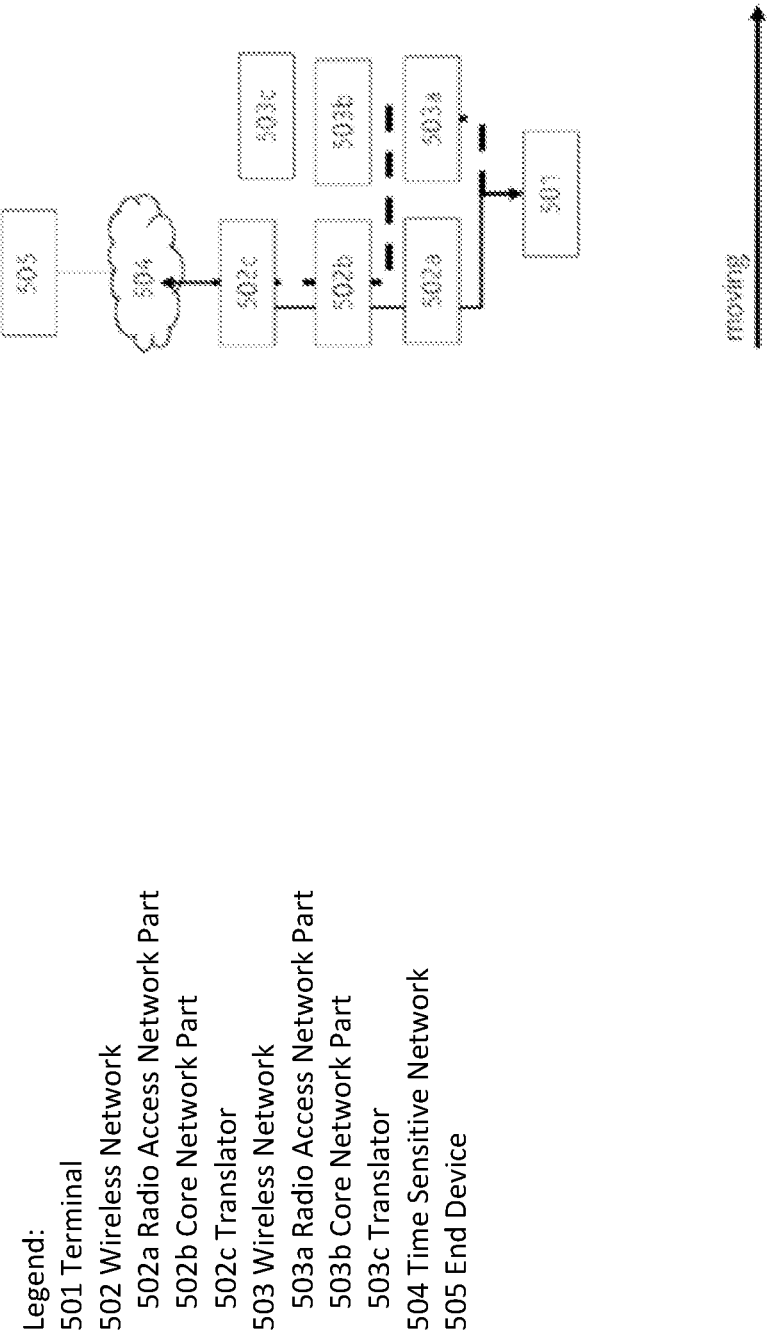
FIGS. 5 to 14 show schematic diagrams of terminals communicating through at least one bridge between different networks.

In FIG. 5, there is provided a terminal 501. The terminal may be any of a user equipment, a time sensitive network translator client and an end device (or represent the combination of all three). The terminal 501 wirelessly connects to wireless networks 502 and 503. The arrow beneath the terminal 501 depicts a direction in which the terminal 501 is physically moving.

Each wireless network comprises respective radio access network parts 502a, 503a, core network parts 502b, 503b, and translator 502c, 503c. The translator 502c, 503c may interface with a time sensitive network 504 in order to connect with an end device 505. Although each wireless network is shown as comprising respective radio access network parts 502a, 503a and core network parts 502b, 503b, it is understood that some components in these networks/parts may be shared. They are being depicted as being logically separate in this Figure in order to indicate that they route communications from terminal 501 to different translators 502c, 503c. Thus, each "wireless network" discussed herein may simply be thought of as different network-based translators/different ports, as this is how it is perceived by a time sensitive network being bridged by each wireless network.

As shown in FIG. 5, terminal 501 is initially connected to wireless network 502. Communications between terminal 501 and end device 505 are thus passed to the time sensitive network 504 via the radio access network part 502a, the core network part 502b, and the translator 502c associated with that wireless network.

As the terminal 501 physically moves, terminal 501 switches from connecting to wireless network 502 to wireless network 503. As shown in FIG. 5, the radio access network part 503a of wireless network 503 is configured to route communications received from the terminal 501 to the corresponding radio access network part 502a of wireless network 502 after the switch has taken place. The radio access network part 502a then passes the routed communications to core network part 502b, which passes the routed communications to translator 502c, which passes the routed communications to the time sensitive network 504.

Figure 6:
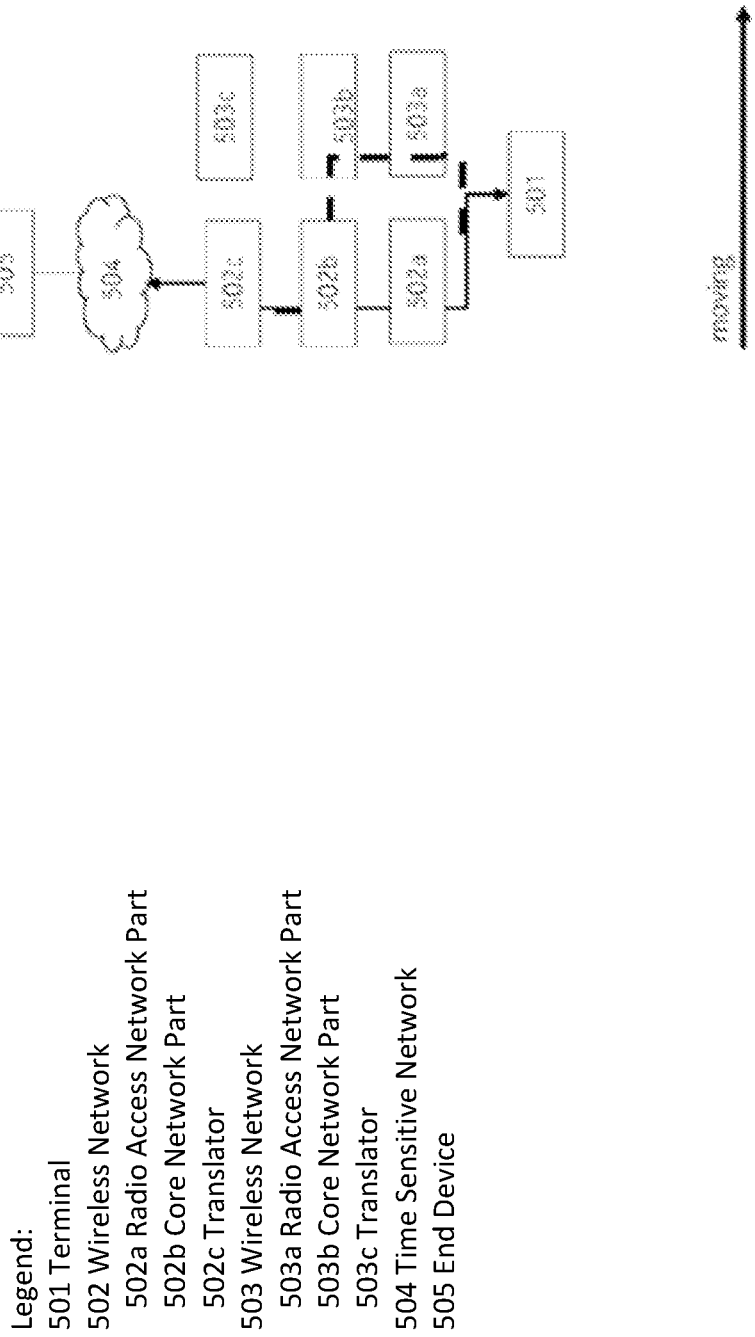

FIG. 6 shows an alternative way of routing the communications, utilising the same labels as in FIG. 5 for corresponding claim elements.

In contrast to the example shown in FIG. 5, in FIG. 6 communications received by wireless network 503 from terminal 501 after the switch are routed from core network element 503b to core network element 502b (i.e. it is not performed by a radio access part). The core network part 502b then passes the routed communications to translator 502c, which passes the routed communications to the time sensitive network 504.

Figure 7:
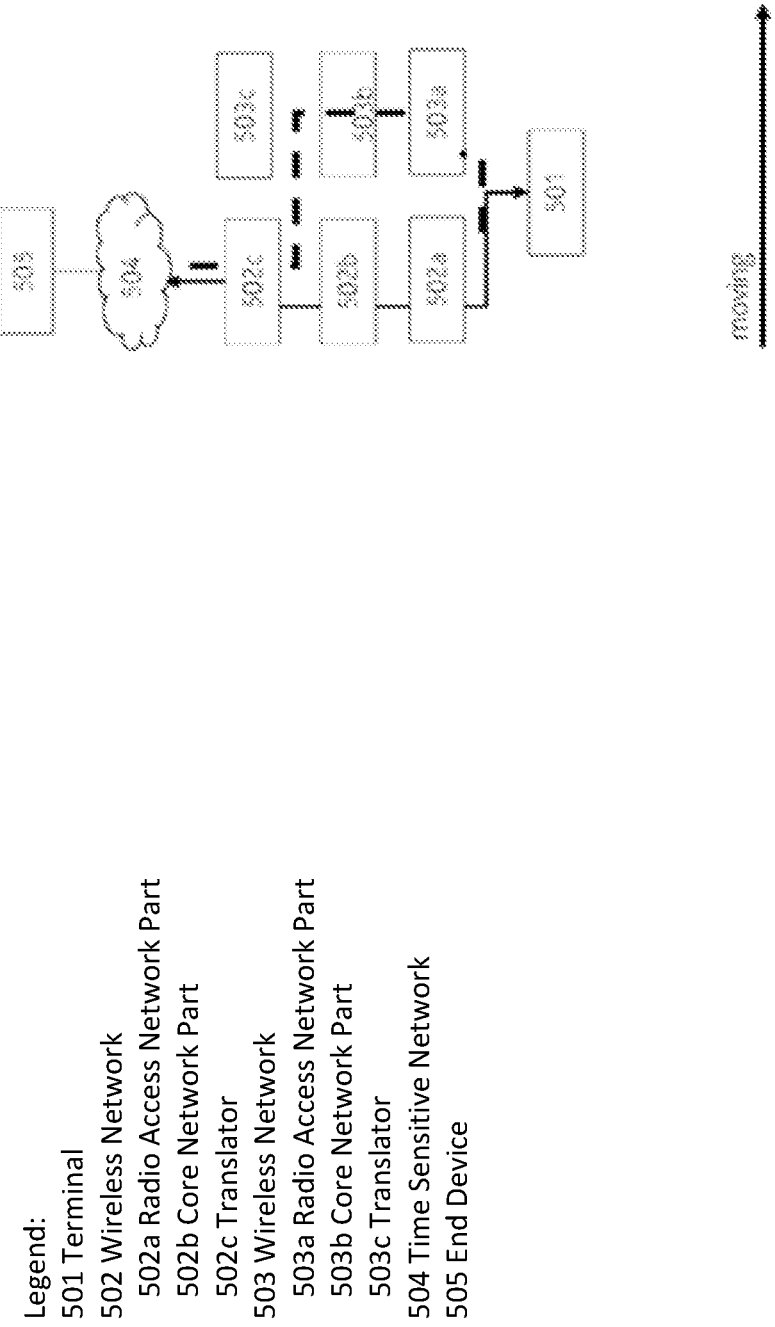

FIG. 7 shows an alternative way of routing the communications, utilising the same labels as in FIG. 5 for corresponding claim elements.

In contrast to the examples shown in FIGS. 5 and 6, in FIG. 7 communications received by wireless network 503 from terminal 501 after the switch are routed directly from core network element 503b to translator 502c in wireless network 502. The translator 502c then passes the routed communications to the time sensitive network 504.

Figure 8:
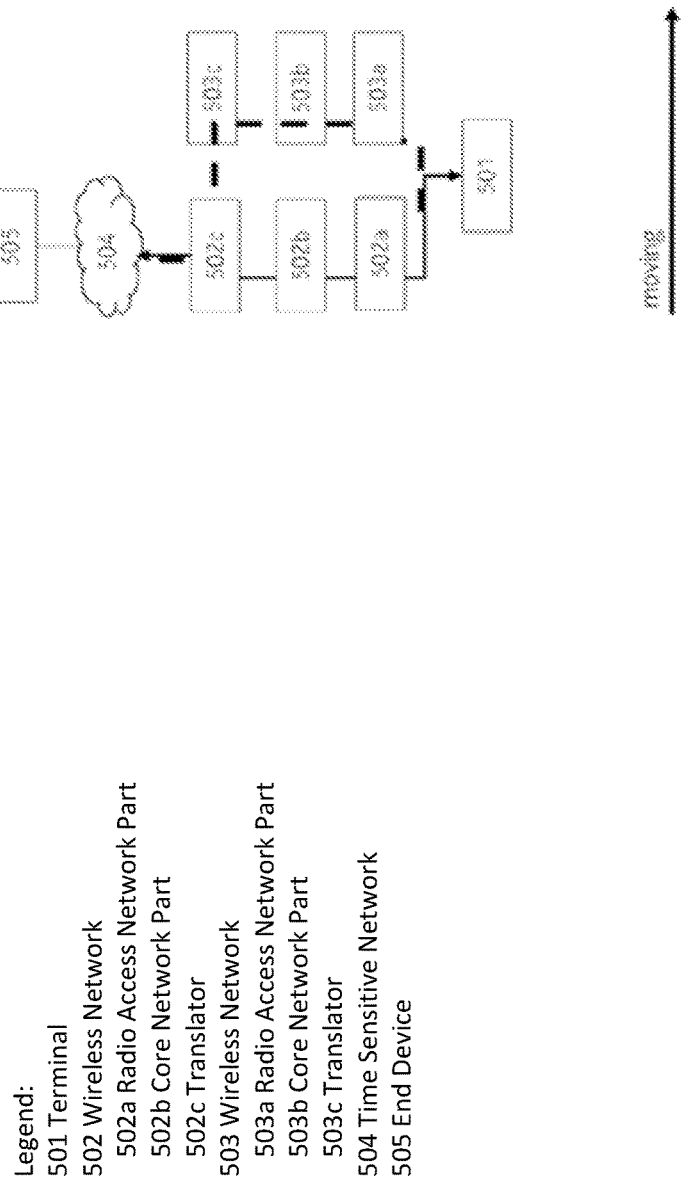

FIG. 8 shows an alternative way of routing the communications, utilising the same labels as in FIG. 5 for corresponding claim elements.

In contrast to the examples shown in FIGS. 5 to 8, in FIG. 7 communications received by wireless network 503 from terminal 501 after the switch are routed directly from translator 503c in wireless network 503 to translator 502c in wireless network 502. The translator 502c then passes the routed communications to the time sensitive network 504. By routing the communications received from terminal 501 in this way, this means that the timer sensitive network 504 can maintain the same port information for contacting terminal 501, regardless of where the terminal 501 roams to.

This example of FIG. 8 is particularly useful in situations in which the wireless networks/translators belong to different operator networks and no roaming agreements for the involved wireless networks are available.

The example of FIG. 8 foresees that traffic received by wireless network 503 is directly routed from translator 503c to translator 502c in wireless network 502. The translator 503c can determine whether or not the traffic/communications needs to be routed between terminal 501 and end device 505 in any of a number of different ways. For example, the translator may detect this using any of: the streaming identity comprised within the traffic and a respective configuration at the translator; and via the time sensitive network translator client identification. For example, the translator 503c may detect that terminal belongs/is registered to another wireless network, and forward respective streams to the wireless network to which the terminal is registered (e.g. 502c).

It is also the case that the terminal may hand over to another wireless network (as per the example in FIG. 4). In this case, in order to avoid that multiple handovers between multiple wireless networks result in traffic routing chains, where the third translator routes the traffic to a neighbouring translator (known due to the handover procedure), which then detects that the traffic needs to be rerouted again to the next translator until the final translator is found. In such a case, the translators are configured to address the final/original translator that belongs to the end device and its respective translator client and user equipment. This option is shown in FIG. 9.

Figure 9:
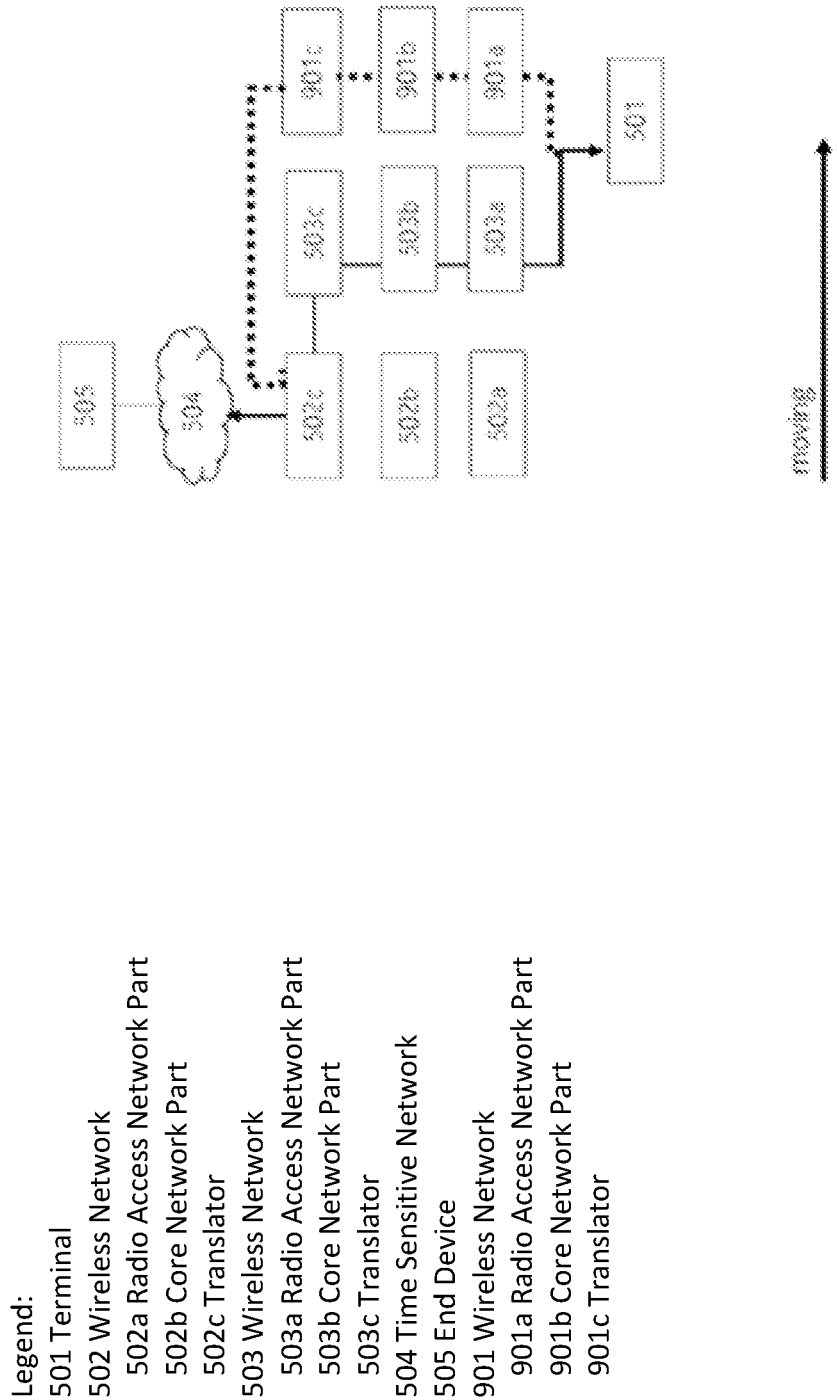

FIG. 9 shows an alternative way of routing the communications, utilising the same labels as in FIG. 5 for corresponding claim elements.

In addition to the system shown in FIG. 8, FIG. 9 further depicts wireless network 901. Wireless network 901 comprises respective radio access network part 901a, core network part 901b, and translator 901c.

As shown in FIG. 9, communications are being handed over to wireless network 903. In this case, the translator 901c is configured to route the traffic received from terminal 501 directly to the translator 502c with which the terminal is registered. This means that the communications/traffic does not need to also pass through wireless network 503 at all.

The above described examples (with reference to FIGS. 5 to 9) may be used in parallel, even between the same two wireless networks/wireless networks.

Where the options are used in parallel, the wireless networks may apply certain rules. The aim of these rules may be to ensure that the routing of traffic is through a maximum of two wireless networks/wireless networks.

For example, one rule may be that for a traffic stream between end devices 501 and 505 using wireless networks 502 and 503, only one option for inter-bridge handover may be active at any one time (even though other terminals/devices using this bridge may utilise other inter-bridge handover options).

As another example rule, inter-bridge handover options for a traffic stream between end device 501 and 505 using wireless networks 502 and 503 can be changed when the terminal is successfully handed back over to its home wireless network (e.g. wireless network 502).

As another example rule, for every wireless network (e.g. 901) that supports handover and that allows the terminal to use the wireless service of this wireless network/wireless network, the former two rules apply for the traffic stream.

An advantage of performing mobility completely within the translator is that it is transparent to the time sensitive network. However, the re-routing of traffic between different translators of a bridge means that the end-to-end latency (i.e. the time taken for communications between the terminal 501 and the end device 505) may increase. This increase in latency may be reported to the time sensitive network 504 when providing bridge delay information. In general, the introduced additional routing traffic and the respective network resources is provided by the operator of each wireless network.

Next, FRER-based handover is considered. In this mechanism, a sequence number is provided for every packet in a stream. Each packet is replicated and sent over two or more paths towards a destination. Near the destination, an entity keeps track of what packets have and have not been received and eliminates any duplicates received from different paths. In this instance, a time sensitive network may maintain multiple ports/translators in parallel for communication with the same end device.

Figure 10:
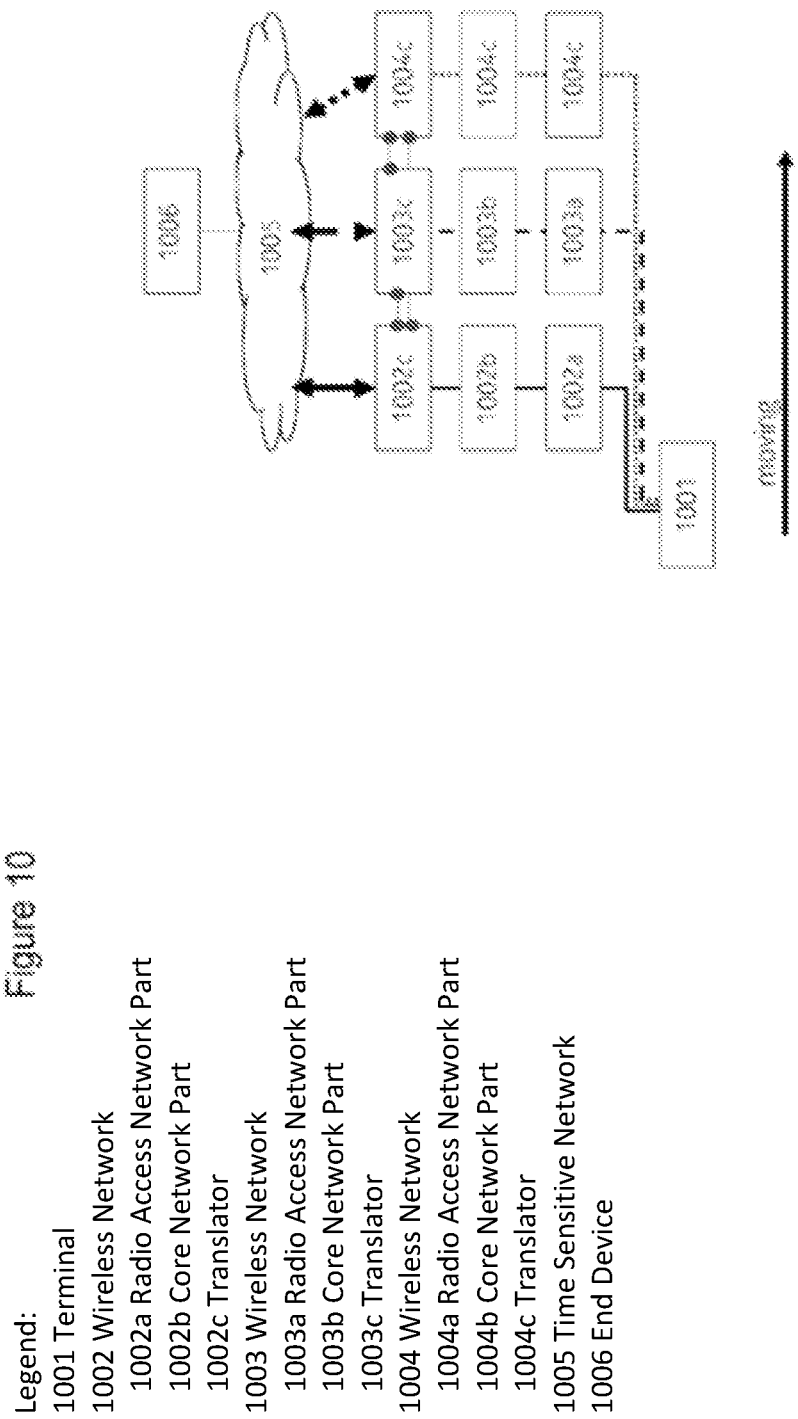

This process is illustrated with respect to FIG. 10.

In FIG. 10, there is provided a terminal 1001. The terminal may be any of a user equipment, a time sensitive network translator client and an end device or a combination thereof (e.g. the user equipment may comprise an end device configured to operate in accordance with a time sensitive network and a translator client disposed therebetween may translate between the two entities. The end device is an apparatus associated with the time sensitive network). For clarity, the following will simply refer to the entity/entities as the terminal. The terminal 1001 wirelessly connects to wireless networks 1002, 1003 and 1004. The arrow beneath the terminal 1001 depicts a direction in which the terminal 1001 is moving.

Each wireless network comprises respective radio access network parts 1002a, 1003a, 1004a, core network parts 1002b, 1003b, 1004b and translator 1002c, 1003c, 1004c. Translators 1002c, 1003c, 1004c may interface with a time sensitive network 1005 in parallel order to connect with an end device 1006. Although each wireless network is shown as comprising respective radio access network parts 1002a, 1003a, 1004a and core network parts core network parts 1002b, 1003b, 1004b, it is understood that some components in these networks/parts may be shared. They are, instead, depicted as being logically separate in this Figure in order to indicate that they route communications from terminal 1001 to different network-based translators 1002c, 1003c, 1004c of a bridge. Thus, each "wireless network" discussed herein may simply be thought of as being those different network-based translators of a bridge.

As shown in FIG. 10, terminal 1001 is not connected to a single translator, but rather replicates and forwards packets intended for end device 1006 to each wireless network 502-504 via radio access network parts 1002a, 1003a, 1004a. These then forwards the packets through their respective core network parts 1002b, 1003b, 1004b to their respective translator 1002c, 1003c, 1004c. The translator 1002c, 1003c, 1004c then each pass the packets to the time sensitive network 1005. The time sensitive network removes duplicate packets such that only one version of each packet is forwarded to end device 1006.

Due to the time sensitive network behaviour, the FRER-based handover considers the direction in which information/communications flow between the terminal 1001 and end device 1006.

Throughout the following, the part of the time sensitive network device/end device that sends the information is called the talker and the part of the time sensitive network device/end device that receives the information is called the listener. In case an end device is required to both send and receive time sensitive network traffic, that end device takes both roles. This principle is shown with respect to FIG. 11.

Figure 11:
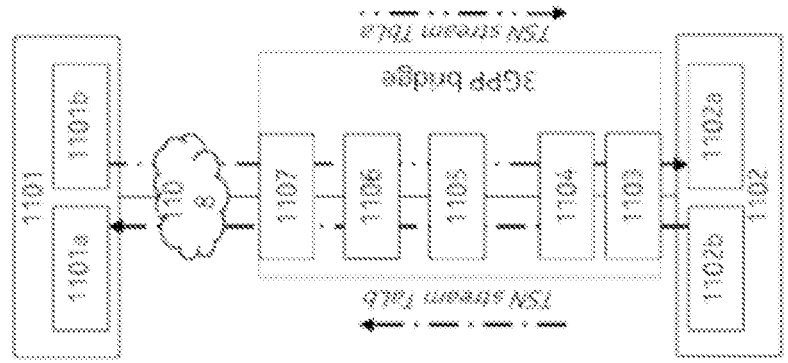

In FIG. 11, there is depicted an end device 1101 and an end device 1102. Each end device comprises a respective listener part 1101a, 1102a and a talker part 1101b, 1102b. As shown in FIG. 11, talker part 1102b transmits a stream of packets to listener part 1101a. First, the stream is passed to a translator client 1103, which passes the stream to user equipment 1104. User equipment 1104 further transmits this information upstream to a radio access network 1105, which passes it to core network 1106. The core network passes this stream to translator 1107, which in turn passes it to the time sensitive network 1108 for forwarding to end device 1101.

The transmissions between talker part 1101b and listener part 1102a takes place in the reverse direction (i.e. talker part to translator, to core access network, etc.), as shown in FIG. 11.

As can be seen in FIG. 11, the overall bridge between end device 1102 and time sensitive network 1108 may be considered to comprise the user equipment and the translator (i.e. all entities lying between the end device 1102 and the time sensitive network 1108). In other words, a bridge may comprise both user equipment/user domain elements in addition to network elements, such as the translator client 1103, user equipment 1104, radio access network 1105, core network 1106 and translator 1107.

In order for the end device 1102 to communicate with other end devices via the time sensitive network and through any network part of the bridge, some of the translator client functionality may need to be extended. This translator client functionality (e.g. 1103) is configured to act in parallel on behalf of multiple translators when the UE has parallel connections to these different translators. This can be done in a number of ways. For example, the stream may be handled dynamically (i.e. in real time) according to the configured translator client functionality behaviours before the stream is forward to respective radio access network parts, core network parts and translators of the wireless network. As another example, the translator client functionality may be configured to provide a separate client functionality for each translator.

In the case that the end device 1101 acts as a talker while end device 1102 acts as a listener, the time sensitive network is configured to forward traffic from the end device 1101 to multiple translators in parallel. In case end device 1101 acts as listener, the time sensitive network needs to be prepared to receive traffic from the end device 1102 from multiple translators. For example, at a first time, data may be received from a first translator. After a successful handover, data may subsequently be received from second translator, depending on the movement of end device.

To help account for this, the following proposes reserving network resources in the 3GPP/wireless system for not only the "active" connections, but also for possible connections. For example, if end device 1102 can be connected to multiple translators, then these translators and the time sensitive network connecting them to end device 1101 may reserve resources for effecting a fast handover.

Beside the network resource reservation, the translator of each wireless network may be modified to support at least one of the following aspects.

In a first aspect, when the time sensitive network replicates the information sent by the talker of end device 1102 to make the information available for multiple wireless networks/translators, the time sensitive network utilises information on which wireless network is currently providing an active path to the end device 1101 for determining a path for forwarding the replicated information. In such a case, the information on the availability of respective paths may be provided to the time sensitive network by any of the translator 1107 and the translator client functionality 1103.

In a second aspect, if a translator detects that the communication path to the listener of end device 1102 is not available (for example, if the user equipment is camped on a radio access network of another wireless network), the translator may automatically eliminate the received information.

In another aspect, if a translator detects that the communication path to the listener of end device 1102 is active, it may forward received data stream packets to the listener via the respective translator client functionality.

In another aspect, if the translator detects that the communication path to the talker of end device 1102 if active, and the information is received according to a defined time sensitive network schedule, the translator may forward the received information to the time sensitive network (or directly to end station 1102 if the end station is directly connected to the translator).

Since the talker of end device 1102 may transmit information through the active translator (and not through inactive translators), there are no redundant packets arriving in the time sensitive network according to the present scheme. Consequently, the time sensitive network may create alarms indicating that no redundant packets have been received (contrary to the defined FRER-based handover mechanism). To handle this, any of the following mechanisms may be employed.

First, the alarms themselves may be disabled. This may be performed for specific streams/packets, for example, those streams/packets indicated as being mobility supporting redundant streams may have alarms disabled, whilst other streams/packets may continue to alarms generated on them.

Second, if the alarms cannot be disabled, a fault management system that receives those alarms may ignore them as long as the alarms are generated for streams/packets indicated as being mobility supporting redundant streams.

Third, translator of an active wireless network may be configured to replicate the packets/streams send from end device 1102 and to forward them to translators of inactive wireless networks. The inactive wireless networks may, in turn, forward them to the time sensitive network. This means that no alarm will be generated.

Figure 12:
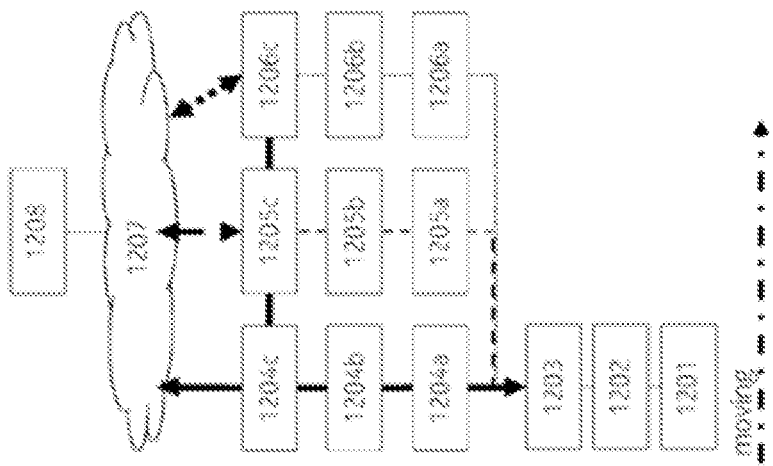
Figure 13:
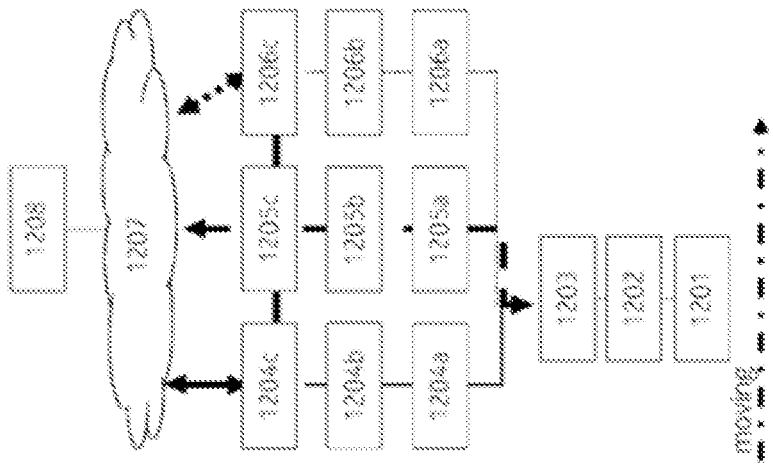
Figure 14:
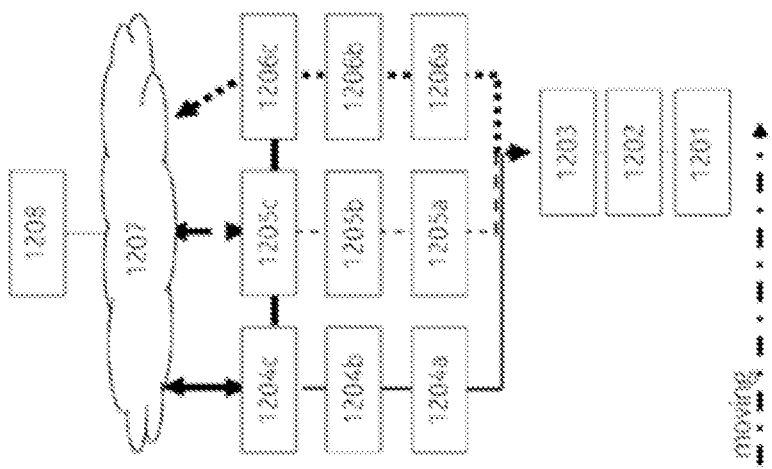

FIGS. 12 to 14 provide illustrative examples of how traffic may be exchanged between end devices when FRER-based handover is employed. In each of FIGS. 12 to 14, active connections are depicted in bold whilst inactive connections are depicted regularly.

FIG. 12 shows an end device 1201 connected to translator client functionality 1202, which is in turn connected to user equipment 1203. User equipment 1203 may connect to any of wireless networks 1204-1206 via respective radio access networks 1204a-1206a. User equipment 1203 is shown as having an active connection to radio access network 1204. Each radio access network is connected to a respective core network 1204b-1206b, which are in turn connected to a respective translator 1204c-1206c. Each of the translators are actively connected to time sensitive network 1207, which routes communications to and from an end device 1208.

Further in FIG. 12, the end device 1201 is connected to translator 1204c via wireless network 1204 and so the translator client 1202 is configured to interact with translator 1204c. The bold arrows in the Figure indicates the active communication paths, while the regular lines/arrows indicate inactive communication paths.

FIG. 13 illustrates a situation in which the user equipment/end device has moved. In this Figure, end device 1201 is connected to time sensitive network 1207 via an active communication path through wireless network 1205. Therefore, the translator client 1202 is configured to interact with translator 1205c.

FIG. 14 illustrates a further situation in which the user equipment/end device has moved. In this Figure end device 1201 is connected to time sensitive network 1207 via an active communication path through wireless network 1206. Therefore, the translator client 1202 is configured to interact with translator 1206c.

Subsequent to the above discussion of specific examples, the following presents and describes flow charts of some of the general aspects performed by various entities of those discussed above. In a general form, all of the above-described actions undertakes to perform some mobility-related action in a translator part of a bridge (where translator part of a bridge here encompasses both the above-described translators and the translator clients).

FIG. 15 is a flow chart depicting some of the operations performed by a translator (and/or a translator client) of a bridge between an end device of a communication network and the communication network.

At 1501, an apparatus translates between a first communication apparatus and a first wireless communication network operating as at least part of a bridge between the first communication apparatus and a second communication apparatus.

At 1502, it is determined that the first and/or second communication apparatus is undergoing or has undergone a mobility event.

At 1503, at least part of a mobility procedure resulting from the mobility event is executed. In other words, a translator part of a bridge executes mobility functionality. Examples of executed parts of mobility procedures are described below.

Figure 16:
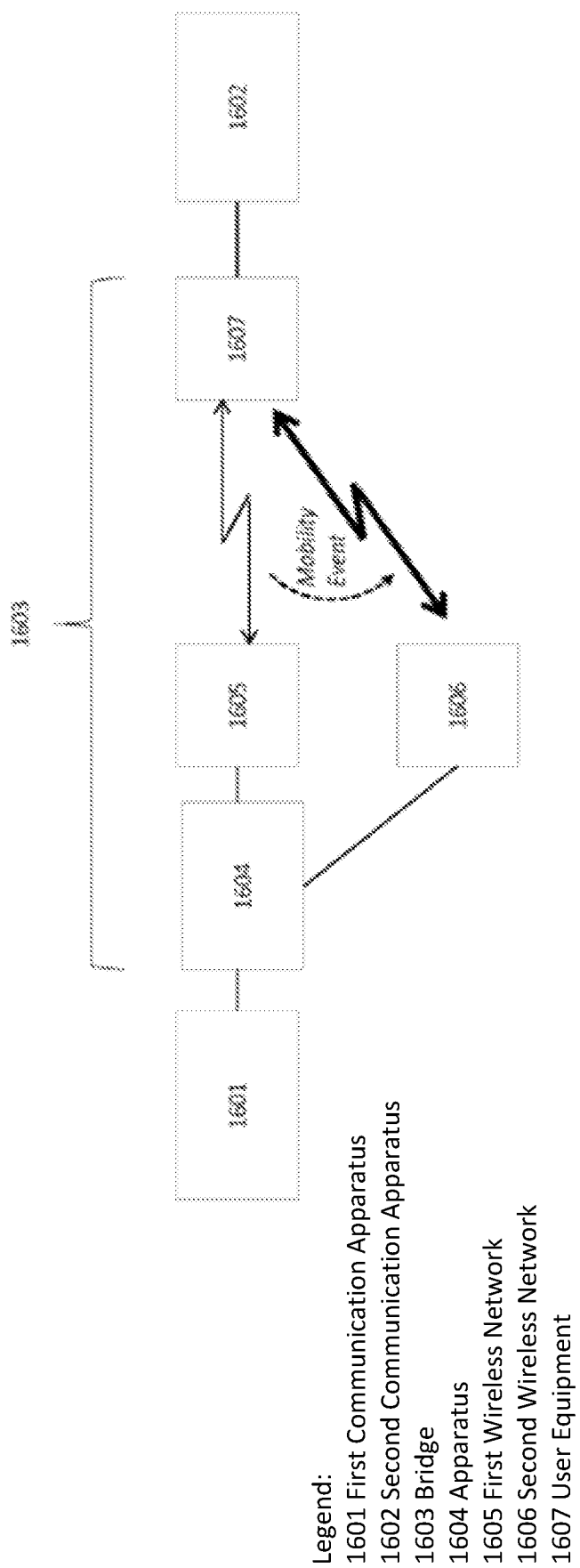
FIGS. 16 to 18 show schematic diagrams of terminals communicating through at least one bridge between different networks.

As a first example, we refer to FIG. 16.

FIG. 16 depicts a first communication apparatus 1601 communicating with a second communication apparatus 1602 via bridge 1603.

The bridge 1603 comprises an apparatus 1604 configured to operate as per FIG. 15, a first wireless network 1605, a second wireless network 1606 and a user equipment 1607 that may physically comprise the second communication apparatus. The apparatus 1604 may be configured to translate between both the first communication apparatus 1601 and each of the first and second wireless networks 1605, 1606.

As shown in FIG. 16, the user equipment 1607 initially communicates traffic from the second communication apparatus 1602 to the first communication apparatus 1601 via the first wireless network 1605. Subsequent to a mobility event, this traffic is instead routed via the second wireless network 1606. There is a short time window when the user equipment 1607 is connected to both wireless networks. Subsequent to determining that the second communication apparatus has undergone a mobility event, the apparatus/translator 1604 executes at least part of the mobility procedure by receiving first communication traffic from the second communication apparatus via a second wireless communication network operating as at least part of the bridge between the first communication apparatus and the second communication apparatus; and forwarding the first received communication traffic to the first communication apparatus by translating between the second wireless communication network and the first communication apparatus.

Figure 17:
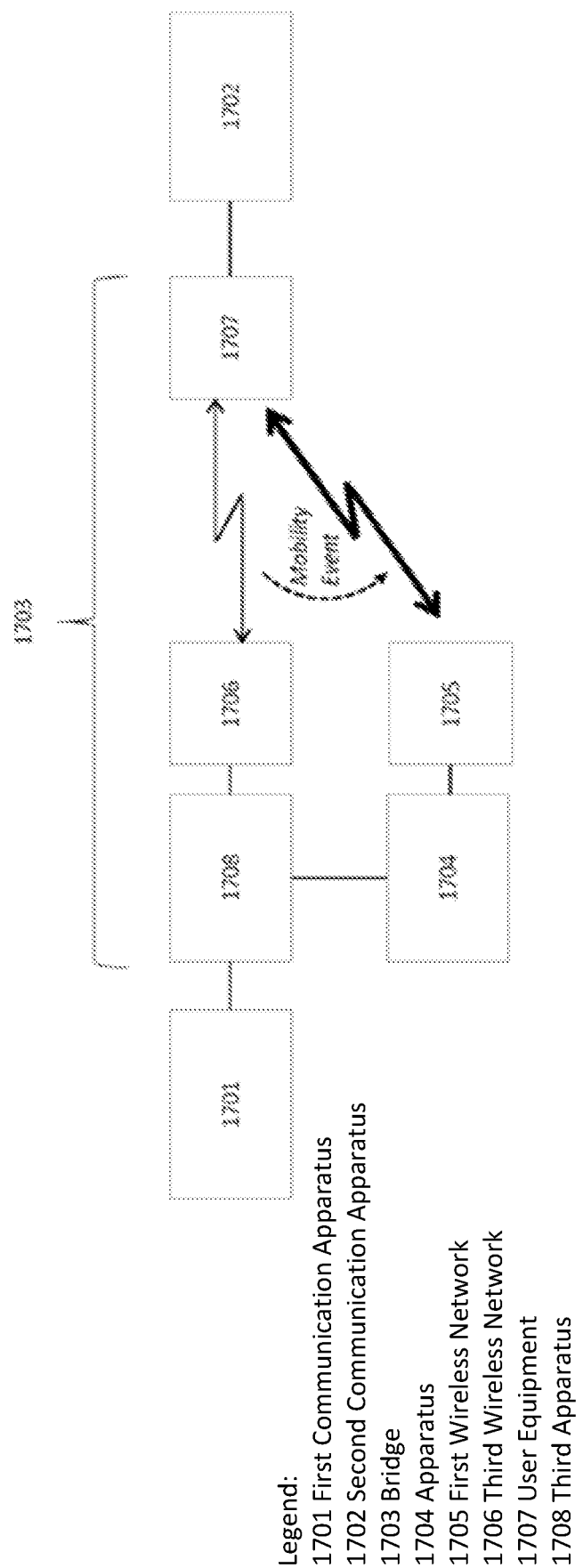

As a second example, we refer to FIG. 17.

FIG. 17 depicts a first communication apparatus 1701 communicating with a second communication apparatus 1702 via bridge 1703.

The bridge 1703 comprises apparatus 1704 configured to operate as per FIG. 15, a first wireless network 1705, a third wireless network 1706 and a user equipment 1707 that may physically comprise the second communication apparatus. Also shown is a third apparatus 1708 arranged to translate between the third wireless network 1706 and the first communication apparatus 1701.

The apparatus 1704 may be configured to translate between the first communication apparatus 1601 and the first wireless networks 1705.

As shown in FIG. 17, the user equipment 1707 initially communicates traffic from the second communication apparatus 1702 to the third communication apparatus 1708 via the third wireless network 1706. The third apparatus is configured to translate between the first communication apparatus and the third wireless communication network operating as at least part of the bridge between the first communication apparatus and the second communication apparatus. Subsequent to a mobility event, this traffic is instead routed via the first wireless network 1705 and apparatus/translator 1704. There is a short time window when the user equipment 1707 is connected to both wireless networks. Subsequent to determining that the second communication apparatus has undergone a mobility event, the apparatus/translator 1704 executes at least part of the mobility procedure by receiving second communication traffic from the second communication apparatus; identifying the third apparatus 1708; and forwarding the received second communication traffic from the second communication apparatus to the third apparatus 1708.

As a third example, we refer back to the arrangement shown in FIG. 16.

This third example relates to when communications are received from the first communication apparatus 1601 for routing to the second communication apparatus 1602. As shown in FIG. 16, the user equipment 1607 initially communicates traffic from the second communication apparatus 1602 to the first communication apparatus 1601 via the first wireless network 1605. Subsequent to a mobility event, this traffic is instead routed via the second wireless network 1606. There is a short time window when the user equipment 1607 is connected to both wireless networks. Subsequent to determining that the second communication apparatus has undergone a mobility event, the apparatus/translator 1604 executes at least part of the mobility procedure by receiving third communication traffic from the first communication apparatus; and forwarding the third received communication traffic to the second communication apparatus by translating between the first communication apparatus and the second wireless communication network operating as at least part of the bridge between the first communication apparatus and the second communication apparatus.

As a fourth example, we refer back to the arrangement shown in FIG. 17.

This fourth example relates to when communications are received from the first communication apparatus 1701 for routing to the second communication apparatus 1702. Subsequent to determining that the second communication apparatus has undergone a mobility event, the apparatus/translator 1704 executes at least part of the mobility procedure by receiving fourth communication traffic from the third apparatus, the third apparatus comprising means for translating between the first communication apparatus and the third wireless communication network operating as at least part of the bridge between the first communication apparatus and the second communication apparatus; and forwarding the received fourth communication traffic to the second communication apparatus. There is a short time window when the user equipment 1707 is connected to both wireless networks (e.g. during execution of the mobility event).

Figure 18:
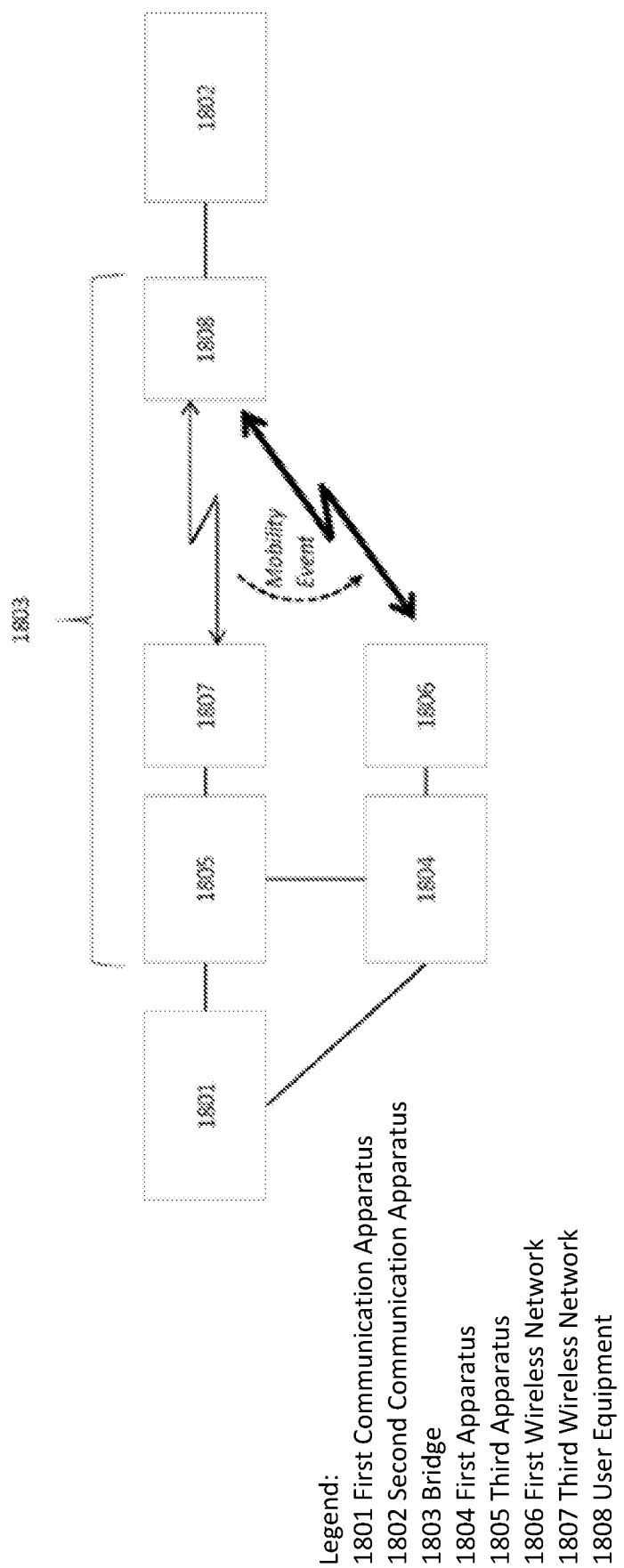

For the fifth and sixth examples, we refer to the arrangement depicted in FIG. 18.

FIG. 18 shows a first communication apparatus 1801 configured to communicate with a second communication apparatus 1802 via bridge 1803. The bridge 1803 comprises a first apparatus 1804 configured to operate as described above in relation to FIG. 15. Also shown is a third apparatus 1805 configured to operate as described above in relation to FIG. 15. The first apparatus 1804 is configured to translate between the first communication apparatus 1801 and the first wireless network 1806. The third apparatus 1805 is configured to translate between the first communication apparatus 1801 and the third wireless network 1807. The first and third wireless networks are also comprised within the bridge 1803, as is user equipment 1808. User equipment 1808 may physically comprise the second communication apparatus 1802. In this arrangement, the first communication apparatus 1801 has simultaneous direct connections to each of the first and third apparatuses 1804, 1805. As in the previous arrangements, the user equipment 1808 executes a mobility event from the third wireless network 1807 to the first wireless network 1806. There is a short time window when the user equipment 1808 is connected to both wireless networks (e.g. during execution of the mobility event).

For the fifth example, executing at least part of a mobility procedure comprises receiving fifth communication traffic from the second communication apparatus, identifying a third apparatus, the third apparatus comprising means for translating between the first communication apparatus and a third wireless communication network operating as at least part of the bridge between the first communication apparatus and the second communication apparatus, and forwarding the received fifth communication traffic from the second communication apparatus to the third apparatus and to the first communication apparatus.

For the sixth example, executing at least part of a mobility procedure comprises receiving sixth communication traffic from the first communication apparatus, determining whether or not the apparatus forms part of an currently active communication path to the second communication apparatus. When the apparatus does form part of the currently active communication path, forwarding the received sixth communication traffic to the second communication apparatus. When the apparatus does not form part of the currently active communication path, discarding the received sixth communication traffic.

In the above (and in the following), it is understood that the term "terminal" may refer to the end device alone, and/or to the combination of the end device, translator client and user equipment associated thereto (as discussed above). Elements comprises within the bridge may operate according to a wireless communication protocol. The wireless communication protocol may be a 3GPP network. The wireless communication protocol may be a 5G network. The first and second communication apparatuses may operate according to a wired communication network. The wired communication network may be a time sensitive network.

FIG. 19 depicts operations that may be performed by the first communication apparatus.

At 1901, the apparatus simultaneously connects to multiple parts of a bridge, wherein one of said parts forms part of a currently active communication path between the apparatus and a second communication apparatus.

At 1902, the first communication apparatus receives information from at least one of said parts indicating which one of said parts forms part of the currently active communication path.

At 1903, the first communication apparatus forwards the received information to at least one other part of said multiple parts of a bridge. The first communication network may be a wireless communication network. The first communication network may be a 3GPP network. The first communication network may be a 5G network. The second communication network may be a wired communication network. The wired communication network may be a time sensitive network.

The first communication apparatus may be an apparatus located in a core network part of the communication protocol it's operating under.

The first communication apparatus may further detect that only one copy of a packet has been received. In response to this detection, the apparatus may identify whether the packet is part of a stream of packets for which only one copy of the packet is expected. The apparatus may further be arranged to only generate and transmit an alarm (e.g. to a fault and management component in the second communication network) when it is identified that the packet is not part of said stream of packets. This is useful for avoiding needlessly generating an alarm, as described above.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a standalone LTE networks, similar principles maybe applied in relation to other examples of standalone 3G, LTE or 5G networks. It should be noted that other embodiments may be based on other cellular technology other than LTE or on variants of LTE. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
    at least one processor; and
    at least one memory including computer program code, the at least one memory and the computer program code being configured to, with the at least one processor, cause the apparatus at least to perform:
        translating between a first communication apparatus and a first wireless communication network operating as at least one device of a bridge between the first communication apparatus and a second communication apparatus;
        determining that the first communication apparatus or the second communication apparatus is undergoing or has undergone a mobility event; and
        executing at least part of a mobility procedure resulting from the mobility event, wherein the at least part of the mobility procedure comprises:
            receiving communication traffic from one of the first communication apparatus or the second communication apparatus,
            determining whether the apparatus currently is in an active communication path to the other of the first communication apparatus or the second communication apparatus via a second wireless communication network,
            when the apparatus is in the current active communication path, forwarding the received communication traffic to the other of the first communication apparatus or the second communication apparatus, and
            when the apparatus is not in the current active communication path, discarding the received communication traffic.

2. The apparatus as claimed in claim 1, wherein the at least one memory and computer program code are configured, with said at least one processor, to cause the apparatus to further perform:
    determining that the second communication apparatus has undergone the mobility event; and
    executing at least part of the mobility procedure by:
        receiving first communication traffic from the second communication apparatus via the second wireless communication network operating as at least one device of the bridge between the first communication apparatus and the second communication apparatus; and
        forwarding the first received communication traffic to the first communication apparatus by translating between the second wireless communication network and the first communication apparatus.

3. The apparatus as claimed in claim 1, wherein the at least one memory and computer program code are configured, with said at least one processor, to cause the apparatus to further perform:
    determining that the second communication apparatus has undergone the mobility event; and
    executing at least part of the mobility procedure by:
        receiving second communication traffic from the second communication apparatus;
        identifying a third apparatus, the third apparatus being configured to translate between the first communication apparatus and a third wireless communication network operating as at least one device of the bridge between the first communication apparatus and the second communication apparatus; and
        forwarding the received second communication traffic from the second communication apparatus to the third apparatus.

4. The apparatus as claimed in claim 1, wherein the at least one memory and computer program code are configured, with said at least one processor, to cause the apparatus to further perform:
    determining that the second communication apparatus has undergone the mobility event; and
    executing at least part of the mobility procedure by:
        receiving third communication traffic from the first communication apparatus;
        forwarding the third received communication traffic to the second communication apparatus by translating between the first communication apparatus and a fourth wireless communication network; and
        operating as at least one device of the bridge between the first communication apparatus and the second communication apparatus.

5. The apparatus as claimed in claim 1, wherein the at least one memory and computer program code are configured, with said at least one processor, to cause the apparatus to further perform:
    determining that the second communication apparatus has undergone the mobility event; and
    executing at least part of the mobility procedure by:
        receiving fourth communication traffic via a third apparatus, the third apparatus being configured to translate between the first communication apparatus and a fifth wireless communication network operating as at least one device of the bridge between the first communication apparatus and the second communication apparatus; and
        forwarding the received fourth communication traffic to the second communication apparatus via the fifth wireless communication network.

6. The apparatus as claimed in claim 1, wherein the at least one memory and computer program code are configured, with said at least one processor, to cause the apparatus to further perform:
    executing at least part of the mobility procedure by:
        receiving fifth communication traffic from the second communication apparatus;
        identifying a third apparatus, the third apparatus being configured to translate between the first communication apparatus and a sixth wireless communication network operating as at least one device of the bridge between the first communication apparatus and the second communication apparatus; and
        forwarding the received fifth communication traffic from the second communication apparatus to the third apparatus and to the first communication apparatus.

7. An apparatus, comprising:
    at least one processor; and at least one memory including computer program code, the at least one memory and the computer program code being configured to, with the at least one processor, cause the apparatus at least to perform:
simultaneously connecting to multiple devices of a bridge, wherein one of said devices is in a currently active communication path between the apparatus and a second communication apparatus;
receiving information from at least one of said devices indicating which one of said devices is in the currently active communication path;
determining one of said devices is in the active communication path based on the received information;
when the one of said devices is in the current active communication path, forwarding the received information to at least one other device of said multiple devices of the bridge; and
when said devices are not in the current active communication path, discarding the received information.

8. The apparatus as claimed in claim 7, wherein said at least one memory and computer program code are configured, with said at least one processor, to cause the apparatus to further perform:
detecting that only one copy of a packet has been received;
identifying, in response to said detecting, whether the packet is part of a stream of packets for which only one copy of the packet is expected; and
only generating and transmitting an alarm when it is identified that the packet is not part of said stream of packets.

9. A method, comprising:
translating, by an apparatus, between a first communication apparatus and a first wireless communication network operating as at least one device of a bridge between the first communication apparatus and a second communication apparatus;
determining, by the apparatus, that the first communication apparatus or the second communication apparatus is undergoing or has undergone a mobility event; and
executing, by the apparatus, at least part of a mobility procedure resulting from the mobility event, wherein the at least part of the mobility procedure comprises:
receiving communication traffic from one of the first communication apparatus or the second communication apparatus,
determining whether the apparatus currently is in an active communication path to the other of the first communication apparatus or the second communication apparatus via a second wireless communication network,
when the apparatus is in the current active communication path, forwarding the received communication traffic to the other of the first communication apparatus or the second communication apparatus, and
when the apparatus is not in the current active communication path, discarding the received communication traffic.

10. The method as claimed in claim 9, comprising:
determining, by the apparatus, that the second communication apparatus has undergone the mobility event; and
executing, by the apparatus, at least part of the mobility procedure by:
receiving first communication traffic from the second communication apparatus via the second wireless communication network operating as at least one device of the bridge between the first communication apparatus and the second communication apparatus; and
forwarding the first received communication traffic to the first communication apparatus by translating between the second wireless communication network and the first communication apparatus.

11. The method as claimed in claim 9, comprising:
determining, by the apparatus, that the second communication apparatus has undergone the mobility event; and
executing, by the apparatus, at least part of the mobility procedure by:
receiving second communication traffic from the second communication apparatus;
identifying a third apparatus, the third apparatus being configured to translate between the first communication apparatus and a third wireless communication network operating as at least one device of the bridge between the first communication apparatus and the second communication apparatus; and
forwarding the received second communication traffic from the second communication apparatus to the third apparatus.

12. The method as claimed in claim 9, comprising:
determining, by the apparatus, that the second communication apparatus has undergone the mobility event; and
executing, by the apparatus, at least part of the mobility procedure by:
receiving third communication traffic from the first communication apparatus;
forwarding the third received communication traffic to the second communication apparatus by translating between the first communication apparatus and a fourth wireless communication network; and
operating as at least one device of the bridge between the first communication apparatus and the second communication apparatus.

13. The method as claimed in claim 9, comprising:
determining, by the apparatus, that the second communication apparatus has undergone the mobility event; and
executing, by the apparatus, at least part of the mobility procedure by:
receiving fourth communication traffic from a via a third apparatus, the third apparatus being configured to translate between the first communication apparatus and a fifth wireless communication network operating as at least one device of the bridge between the first communication apparatus and the second communication apparatus; and
forwarding the received fourth communication traffic to the second communication apparatus via the fifth wireless communication network.

14. The method as claimed in claim 9, comprising:
executing, by the apparatus, at least part of the mobility procedure by:
receiving fifth communication traffic from the second communication apparatus;
identifying a third apparatus, the third apparatus being configured to translate between the first communication apparatus and a sixth wireless communication network operating as at least one device of the bridge between the first communication apparatus and the second communication apparatus; and
forwarding the received fifth communication traffic from the second communication apparatus to the third apparatus and to the first communication apparatus.

15. A method, comprising:
simultaneously, by an apparatus, connecting to multiple devices of a bridge, wherein one of the multiple devices is in a currently active communication path between the apparatus and a second communication apparatus;
receiving, by the apparatus, information from at least one of the multiple devices indicating which one of the multiple devices is in the currently active communication path;
determining one of the multiple devices is in the active communication path based on the received information;
when the one of the multiple devices is in the current active communication path, forwarding, by the apparatus, the received information to at least one other device of the multiple devices of the bridge; and
when the multiple devices are not in the current active communication path, discarding the received information.

16. The method as claimed in claim 15, the method comprising:
detecting, by the apparatus, that only one copy of a packet has been received;
identifying, by the apparatus, in response to said detecting, whether the packet is part of a stream of packets for which only one copy of the packet is expected; and
only generating and transmitting an alarm when it is identified that the packet is not part of said stream of packets.

17. A computer program product embodied on a non-transitory computer-readable medium, said computer program product comprising computer code that, when executed by at least one processor of an apparatus, causes the apparatus to perform the method of claim 9.

18. A computer program product embodied on a non-transitory computer-readable medium, said computer program product comprising computer code that, when executed by at least one processor of an apparatus, causes the apparatus to perform the method of claim 15.

* * * * *